(12) United States Patent
Comsa et al.

(10) Patent No.: US 8,840,495 B2
(45) Date of Patent: Sep. 23, 2014

(54) TENSIONER WITH MICRO-ADJUSTMENT FEATURE

(75) Inventors: Rares I. Comsa, Oakville (CA); Flaviu V. Dinca, Richmond Hill (CA); Jacek Stepniak, Innisfil (CA); Gary J. Spicer, Mississauga (CA)

(73) Assignee: Litens Automotive Partnership, Woodbridge (CA)

( * ) Notice: Subject to any disclaimer, the term of this patent is extended or adjusted under 35 U.S.C. 154(b) by 0 days.

(21) Appl. No.: 13/202,169

(22) PCT Filed: Feb. 19, 2010

(86) PCT No.: PCT/CA2010/000229
§ 371 (c)(1),
(2), (4) Date: Sep. 12, 2011

(87) PCT Pub. No.: WO2010/094127
PCT Pub. Date: Aug. 26, 2010

(65) Prior Publication Data
US 2011/0312454 A1 Dec. 22, 2011

Related U.S. Application Data

(60) Provisional application No. 61/153,870, filed on Feb. 19, 2009.

(51) Int. Cl.
*F16H 7/12* (2006.01)
*F01L 1/02* (2006.01)
*F02B 67/06* (2006.01)
*F16H 7/08* (2006.01)

(52) U.S. Cl.
CPC . *F02B 67/06* (2013.01); *F01L 1/02* (2013.01); *F01L 1/024* (2013.01); *F16H 2007/088* (2013.01); *F16H 2007/081* (2013.01); *F16H 2007/0893* (2013.01); *F01L 2103/01* (2013.01); *F16H 7/1281* (2013.01)

USPC .......................................... 474/110; 474/135

(58) Field of Classification Search
USPC ................... 474/110, 135, 115, 117
See application file for complete search history.

(56) References Cited

U.S. PATENT DOCUMENTS 3,954,016 A   5/1976  Sarosy et al.
4,131,306 A  12/1978  Sokoly et al.
(Continued)

FOREIGN PATENT DOCUMENTS

CA      2423577 A1    4/2002
JP     60008553       1/1985
(Continued)

OTHER PUBLICATIONS

International Search Report and Written Opinion of the International Searching Authority for PCT/CA2010/000229, mailed Jun. 17, 2010; ISA/CA.

*Primary Examiner* — William A Rivera
*Assistant Examiner* — Michael Riegelman
(74) *Attorney, Agent, or Firm* — Harness, Dickey & Pierce, P.L.C.

(57) ABSTRACT

In one aspect, the invention is directed to a belt tensioner for tensioning a belt, comprising a pivot shaft that is fixedly mountable with respect to an engine block of an engine, a tensioner arm rotatably mounted to the pivot shaft for pivoting about a tensioner arm axis in a first direction and in an opposing second direction, a pulley rotatably mounted to the tensioner arm for rotation about a pulley axis, and a tensioner spring positioned to bias the tensioner arm in the first direction, wherein the tensioner spring has a first end and a second end, wherein the first end is engaged with the tensioner arm, and a micro adjustment mechanism that is operatively connected to control the position of the second end of the tensioner spring so as to control the tension in the tensioner spring.

20 Claims, 28 Drawing Sheets

(56) References Cited

U.S. PATENT DOCUMENTS

| | | | |
|---|---|---|---|
| 4,160,226 A | | 7/1979 | Taylor |
| 4,454,236 A | * | 6/1984 | Foster et al. .................. 474/135 |
| 4,500,303 A | * | 2/1985 | Sermersheim et al. ....... 474/112 |
| 4,571,223 A | * | 2/1986 | Molloy ......................... 474/133 |
| 4,674,781 A | | 6/1987 | Reece et al. |
| 4,713,045 A | * | 12/1987 | Kodama et al. ............... 474/135 |
| 4,850,466 A | | 7/1989 | Rogakos et al. |
| 4,878,461 A | * | 11/1989 | Sapienza et al. ........... 123/90.15 |
| 4,885,954 A | | 12/1989 | Wanlass |
| 4,893,704 A | * | 1/1990 | Fry et al. ....................... 192/141 |
| 4,934,988 A | * | 6/1990 | Kawamura et al. ........... 474/117 |
| 5,176,580 A | * | 1/1993 | Stamm et al. ................. 474/101 |
| 5,338,076 A | | 8/1994 | Tanaka |
| 5,345,963 A | | 9/1994 | Dietiker |
| 5,381,952 A | | 1/1995 | Duprez |
| 5,439,420 A | * | 8/1995 | Meckstroth et al. .......... 474/133 |
| 5,634,676 A | | 6/1997 | Feder |
| 5,829,346 A | * | 11/1998 | Ast ............................. 100/19 R |
| 5,862,903 A | | 1/1999 | Gruden et al. |
| 5,919,107 A | * | 7/1999 | Stepniak ....................... 474/112 |
| 5,983,739 A | | 11/1999 | Feder |
| 6,149,542 A | | 11/2000 | Lehtovaara |
| 6,422,962 B1 | * | 7/2002 | Lehtovaara et al. .......... 474/101 |
| 6,484,593 B2 | | 11/2002 | Lehtovaara |
| 7,188,021 B2 | | 3/2007 | Spicer et al. |
| 7,217,206 B2 | | 5/2007 | Stone et al. |
| 7,217,207 B1 | * | 5/2007 | Hallen .......................... 474/135 |
| 7,226,377 B2 | * | 6/2007 | Kraus et al. ................... 474/135 |
| 7,552,708 B2 | * | 6/2009 | Serkh et al. ................ 123/198 R |
| 2002/0039945 A1 | * | 4/2002 | Ali et al. ....................... 474/135 |
| 2008/0108464 A1 | * | 5/2008 | Gajewski et al. ............... 474/49 |
| 2009/0011881 A1 | | 1/2009 | Lehtovaara et al. |
| 2009/0156340 A1 | | 6/2009 | Seo |

FOREIGN PATENT DOCUMENTS

| | | |
|---|---|---|
| JP | 11108134 A | 4/1999 |
| JP | 2004036820 | 2/2004 |
| WO | WO-2004/033933 | 4/2004 |
| WO | WO-2005119089 A1 | 12/2005 |
| WO | WO-2006045181 A1 | 5/2006 |

* cited by examiner

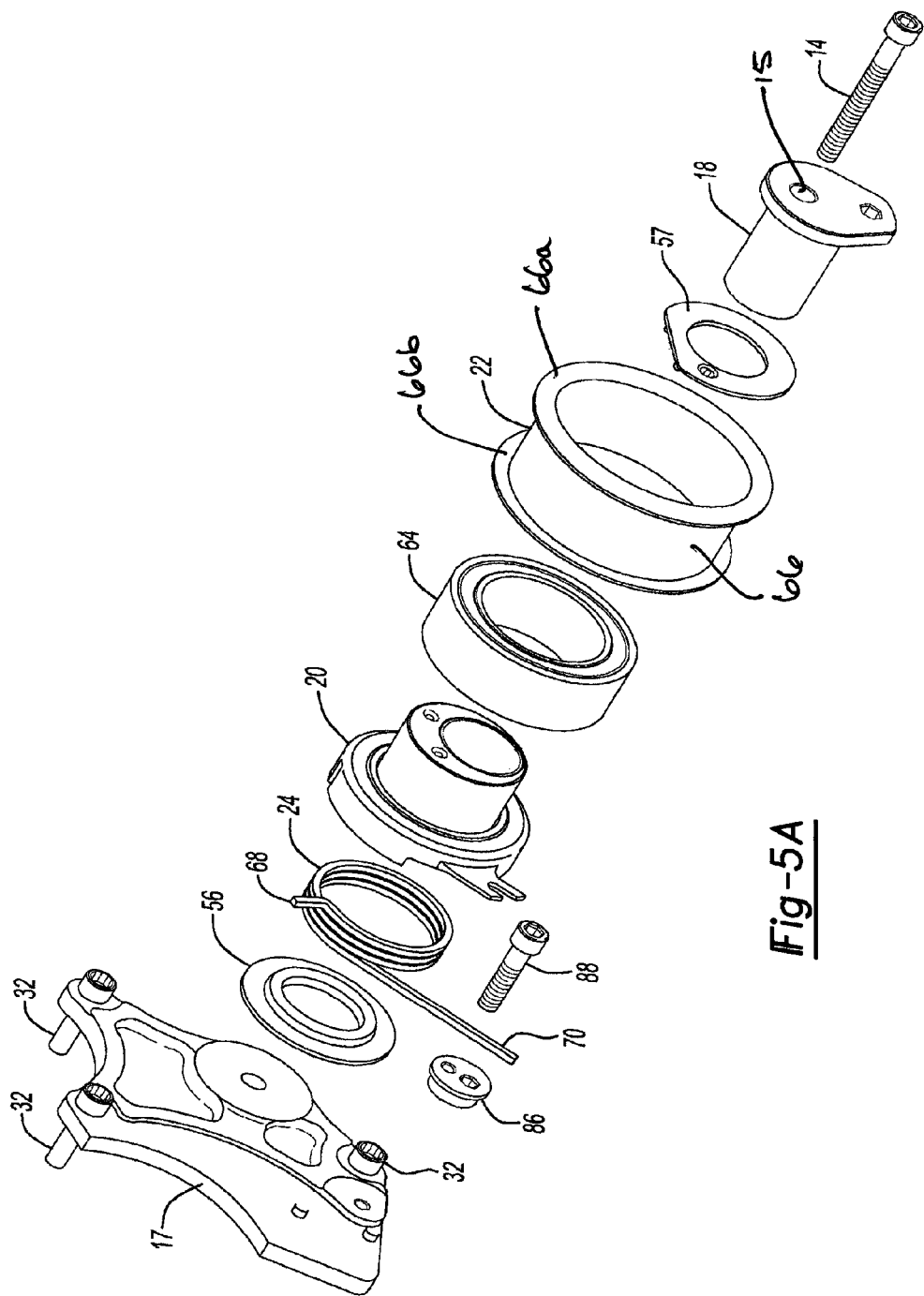

TENSIONER WITH MICRO-ADJUSTMENT FEATURE

CROSS-REFERENCE TO RELATED APPLICATIONS

This application is a U.S. National Stage Application of International application No. PCT/CA2010/000229, filed Feb. 19, 2010 and published in English as WO 2010/094127 A1 on Aug. 26, 2010. This application claims the benefit of U.S. Provisional Application No. 61/153,870, filed Feb. 19, 2009. The disclosures of the above applications are incorporated herein by reference.

FIELD OF THE INVENTION

The present invention relates to tensioners for tensioning engine driven elements such as timing belts, timing chains and accessory drive belts. In particular, the present invention is directed to timing belt tensioners and control over the belt tension generated by the tensioner.

BACKGROUND OF THE INVENTION

Tensioners for timing belts, timing chains and accessory drive belts are well known. Some tensioners, however, are only adjustable if the fastener used to mount them is loosened. This prevents them from being adjusted on a running engine however, since it represents a serious safety hazard to operate the engine with the tensioner not completely fixedly mounted to the engine. Unfortunately, however, adjusting the tensioner on a running engine is the most accurate way to adjust the tensioner.

Another problem with some tensioners is that, if they are not adjusted correctly during the initial installation, the bolt holding them to the engine is loosened and they are repositioned. However, the loosening of the bolt essentially causes the tensioner to lose whatever proximity it had to an acceptable adjustment. Accordingly, the second installation attempt is not a refinement of the first installation attempt. It is thus no more likely to succeed than the first attempt was. Furthermore, reinstalling the tensioner in this way is time consuming.

Another problem with such tensioners is that the installation process is generally carried out manually and it does not lend itself to an automated process.

It would be advantageous to provide a tensioner that at least partially mitigated one or more of these aforementioned problems.

SUMMARY OF THE INVENTION

In one aspect, the invention is directed to a belt tensioner for tensioning a belt, comprising a pivot shaft that is fixedly mountable with respect to an engine block of an engine, a tensioner arm rotatably mounted to the pivot shaft for pivoting about a tensioner arm axis in a first direction and in an opposing second direction, a pulley rotatably mounted to the tensioner arm for rotation about a pulley axis, and a tensioner spring positioned to bias the tensioner arm in the first direction, wherein the tensioner spring has a first end and a second end, wherein the first end is engaged with the tensioner arm, and a micro adjustment mechanism that is operatively connected to control the position of the second end of the tensioner spring so as to control the tension in the tensioner spring.

In another aspect, the invention is directed to a method of tensioning a belt on an engine, comprising:

a) providing a tensioner that includes a pivot shaft, a tensioner arm rotatably mounted to the pivot shaft for pivoting about a tensioner arm axis between a free arm stop position and a load stop position, a pulley rotatably mounted to the tensioner arm for rotation about a pulley axis, a tensioner spring positioned to bias the tensioner arm towards the free arm stop position, wherein the tensioner spring has a first end and a second end, wherein the first end is engaged with the tensioner arm;

b) mounting the tensioner to an engine block of the engine in such a way that the tensioner arm axis is fixed and such that the pulley is engaged with the belt; and c) moving the second end of the tensioner spring, while keeping the tensioner arm axis fixed, to adjust the biasing force with which the tensioner arm engages the belt.

In another aspect the invention is directed to a method of installing a tensioner on an engine automatically and of fine tuning the belt tension after the tensioner is fixedly mounted to the engine.

In another aspect the invention is directed to a tensioner that is capable of being fine tuned in terms of its belt tension profile after being fixedly mounted to the engine.

BRIEF DESCRIPTION OF THE DRAWINGS

The present invention will now be described by way of example only with reference to the attached drawings, in which:

FIG. 5a is an exploded perspective view of the tensioner shown in FIG. 1;

FIG. 25b is a magnified view of a portion of the graph shown in FIG. 25a; and

DETAILED DESCRIPTION OF THE INVENTION

Figure 1:
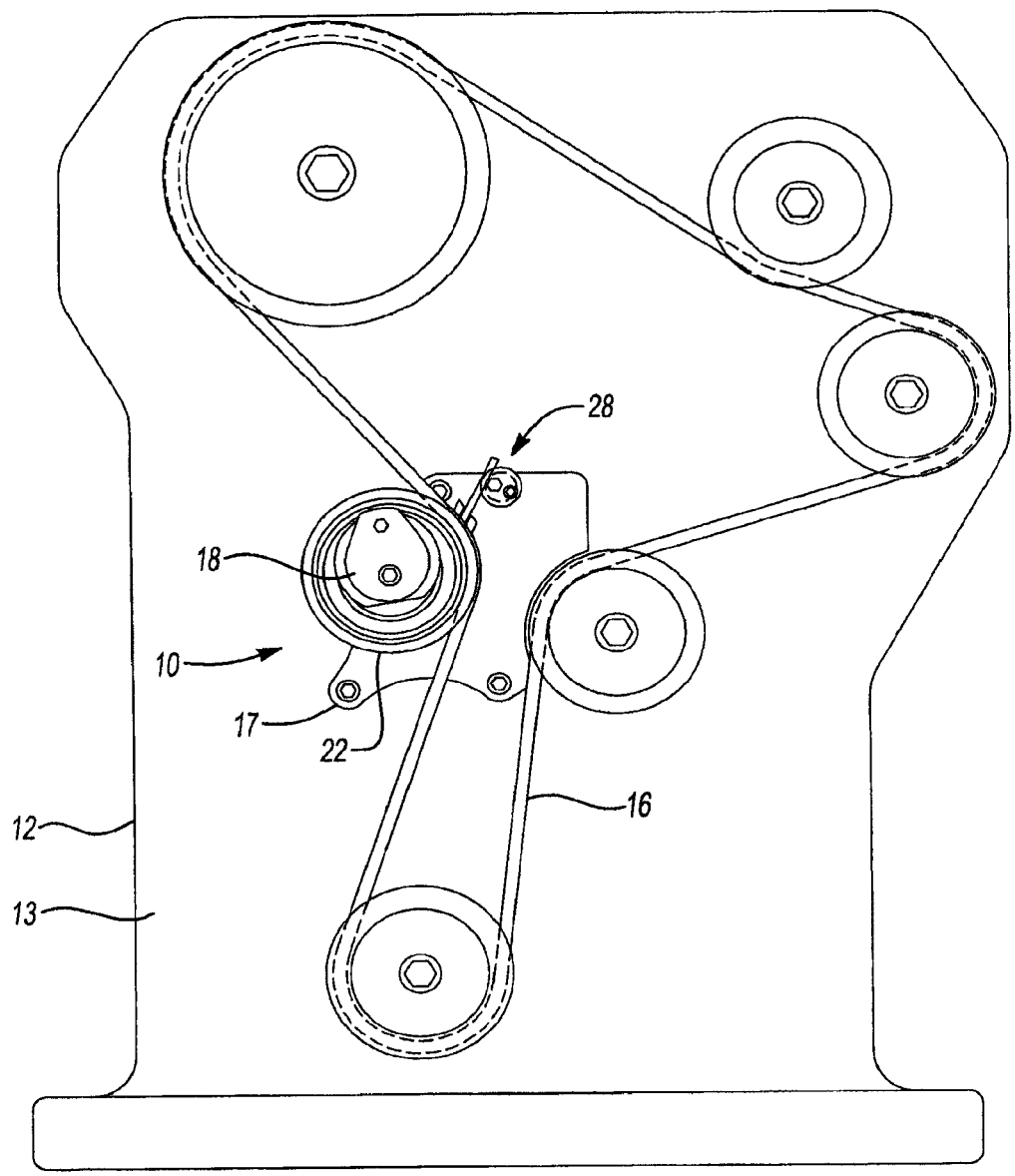
FIG. 1 is a perspective view of a tensioner mounted to an engine block of an engine in accordance with an embodiment of the present invention.
Figure 2:
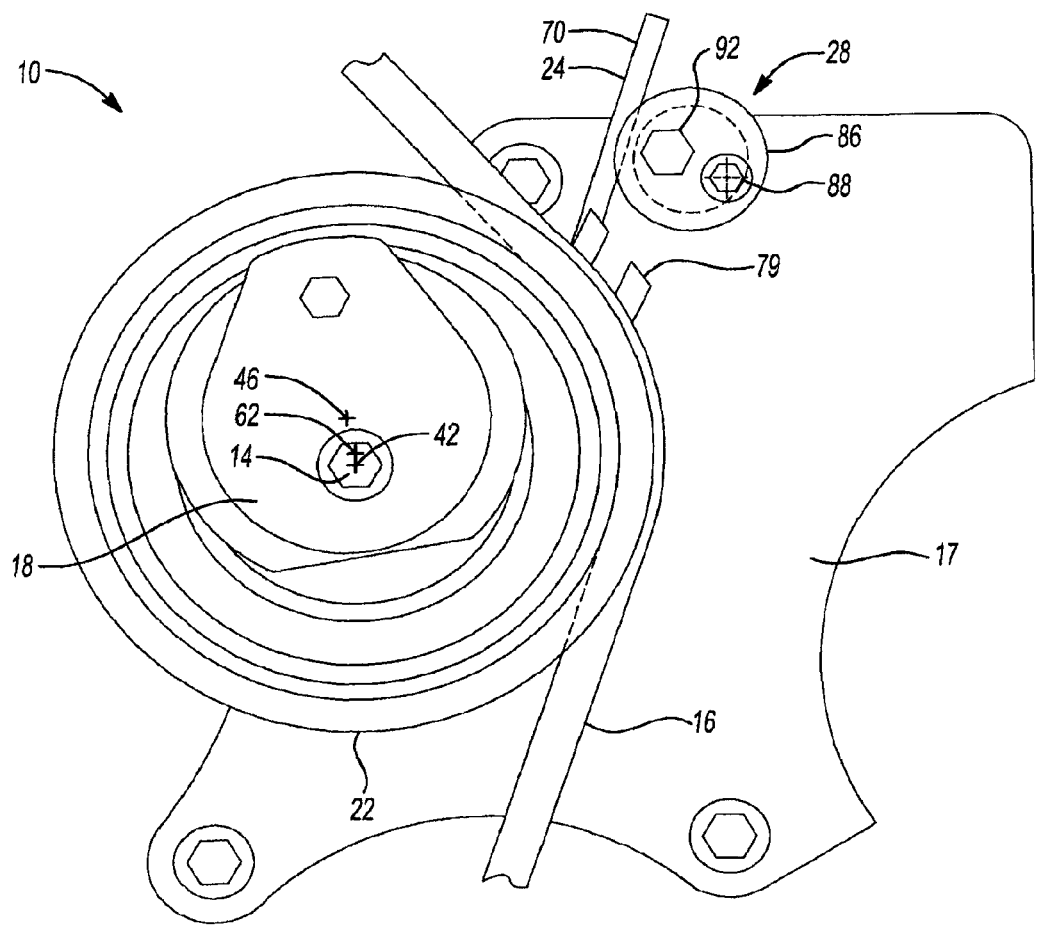
FIG. 2 is a magnified plan view of the tensioner shown in FIG. 1, with a spring end in a first position urged in a winding direction.
Figure 5B:
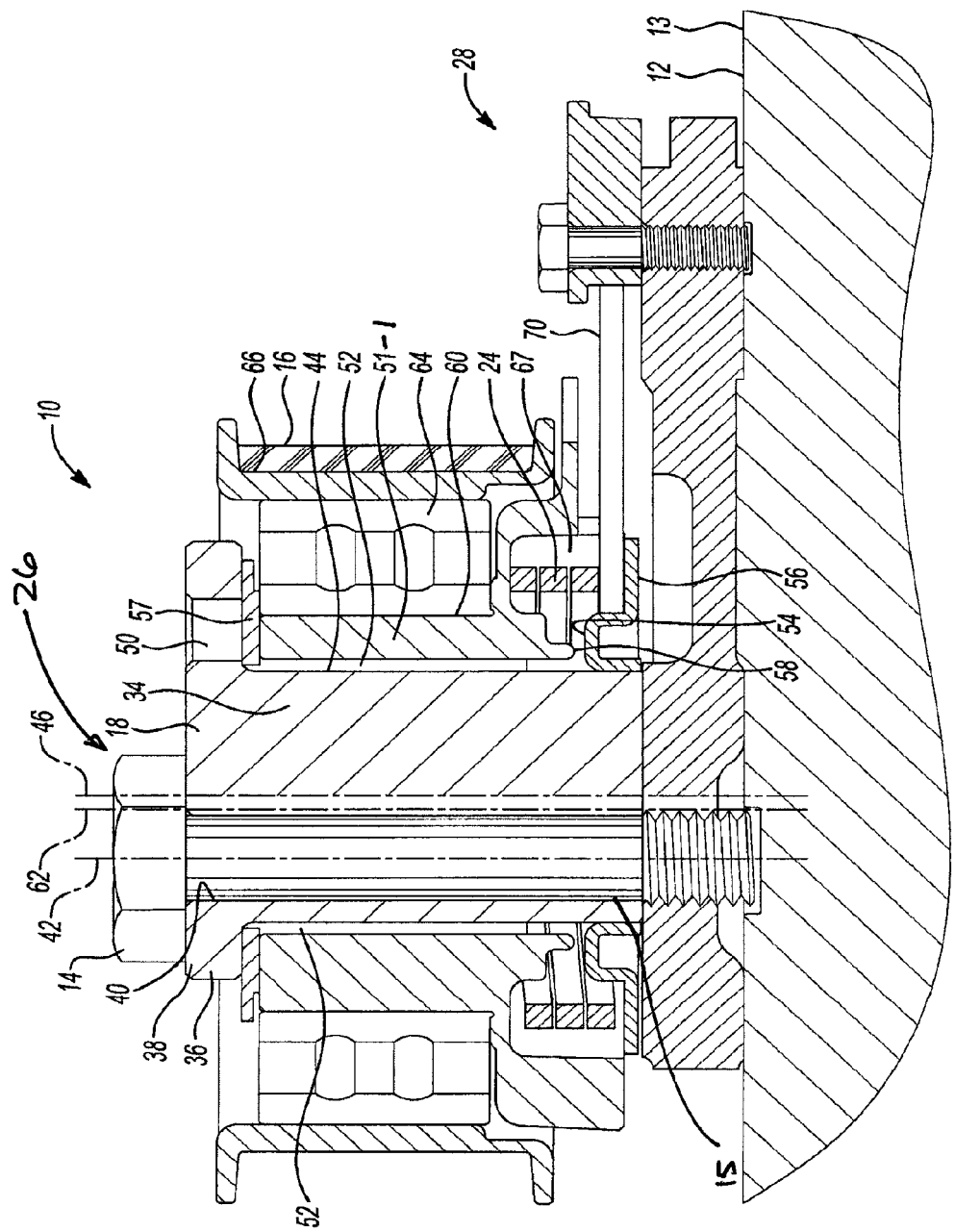
FIG. 5b is an sectional elevation view of the tensioner shown in FIG. 1.

Reference is made to FIG. 1, which shows a belt tensioner 10 in accordance with an embodiment of the present invention. The belt tensioner 10 is shown mounted to an engine block 12 of an engine 13. The tensioner 10 is used for tensioning a belt 16, such as a drive belt or a timing belt. FIG. 2 shows a magnified view of the tensioner 10 in plan view. FIG. 5a shows an exploded perspective view of the tensioner 10. FIG. 5b shows a sectional elevation view of the tensioner 10.

With reference to FIG. 5b, the tensioner 10 includes an optional base plate 17, a pivot shaft 18, a tensioner arm 20, a pulley 22, a tensioner spring 24, a coarse adjustment mechanism 26 for the belt tension, which may be referred to as a macro-adjustment mechanism 26, and a fine adjustment mechanism for the belt tension, which may be referred to as a micro-adjustment mechanism 28. The base plate 17 is mountable to the engine block 12 and provides a mounting surface for the micro-adjustment mechanism 28, which is described further below. The base plate 17 may mount to the engine block 12 by way of a plurality of base plate fasteners 32 (FIG. 1).

Referring to FIG. 5b, the pivot shaft 18 includes a pivot shaft body 34 and a pivot shaft flange 36 at the distal end, shown at 38, of the pivot shaft body 34. The pivot shaft body 34 has a pivot shaft fastener aperture 40 therethrough, which permits the pass-through of the pivot shaft fastener 14 therethrough to fasten the pivot shaft 10 to the base plate 12 thereby fixing the pivot shaft 18 rotationally. The pivot shaft fastener aperture 40 extends along a pivot shaft rotation axis 42.

The pivot shaft 18 has a tensioner arm mounting surface 44 which is centered about a tensioner arm pivot axis 46. The tensioner arm 20 mounts rotatably to the tensioner arm mounting surface 44 and thus pivots about the tensioner arm pivot axis 46. It will be noted that the tensioner arm pivot axis 46 is spaced from, ie. offset from, the pivot shaft fastener aperture 40. When the pivot shaft fastener 14 is only partially tightened in the tensioner mounting aperture 15, the pivot shaft 18 is rotatable, which permits adjustment of the angular position of the tensioner arm pivot axis 46 about the pivot shaft rotation axis 42. The two axes 40 and 46 are shown also in the plan view in FIG. 2. Referring again to FIG. 5b, the macro-adjustment mechanism 26 is provided by the offset nature of the pivot shaft fastener aperture 40 and the tensioner arm pivot axis 46, and will be discussed further below.

Figure 9:
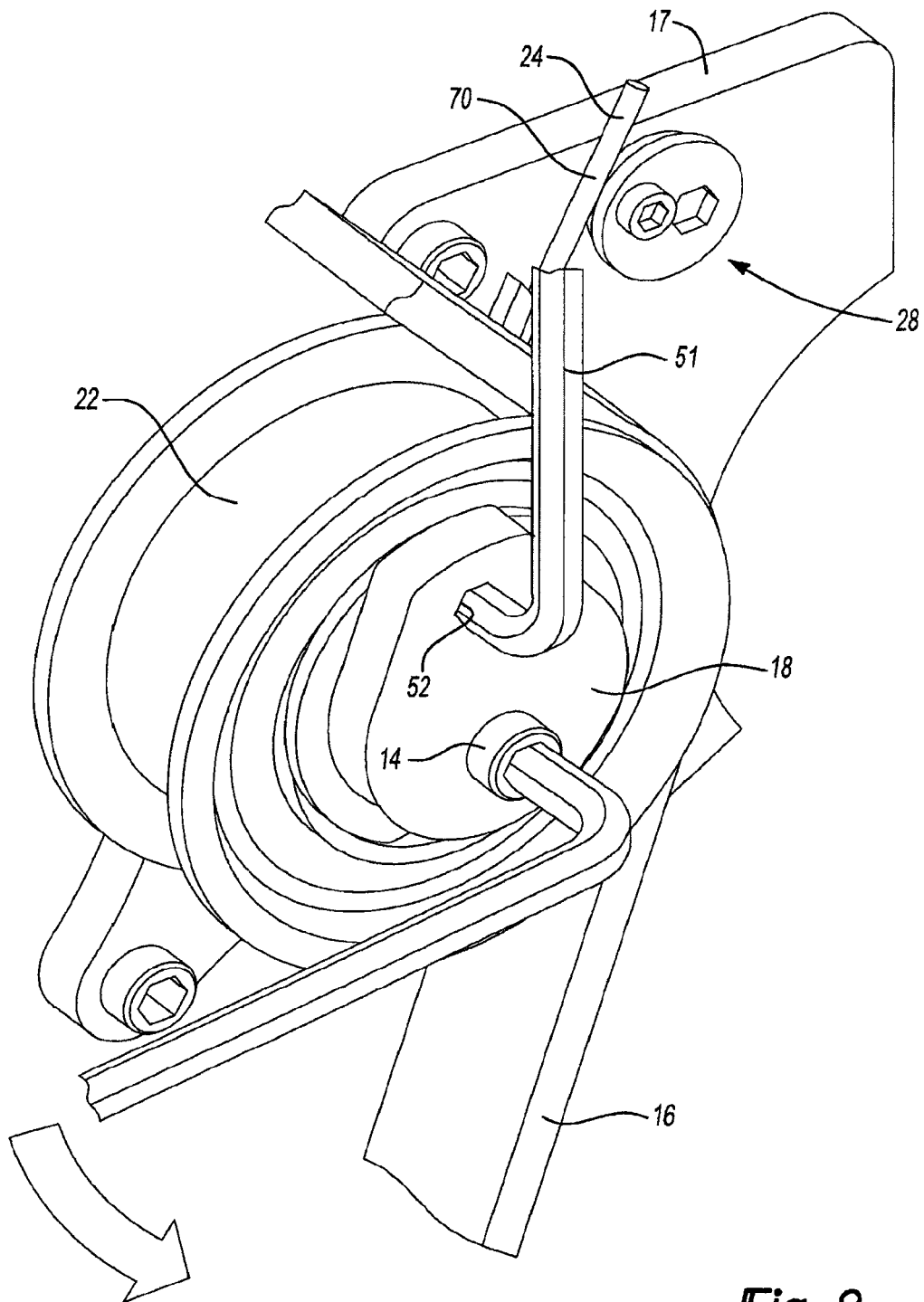
FIGS. 9-10 are perspective views of the tensioner shown in FIG. 1, illustrating adjustment of a pivot shaft on the tensioner.
Figure 10:
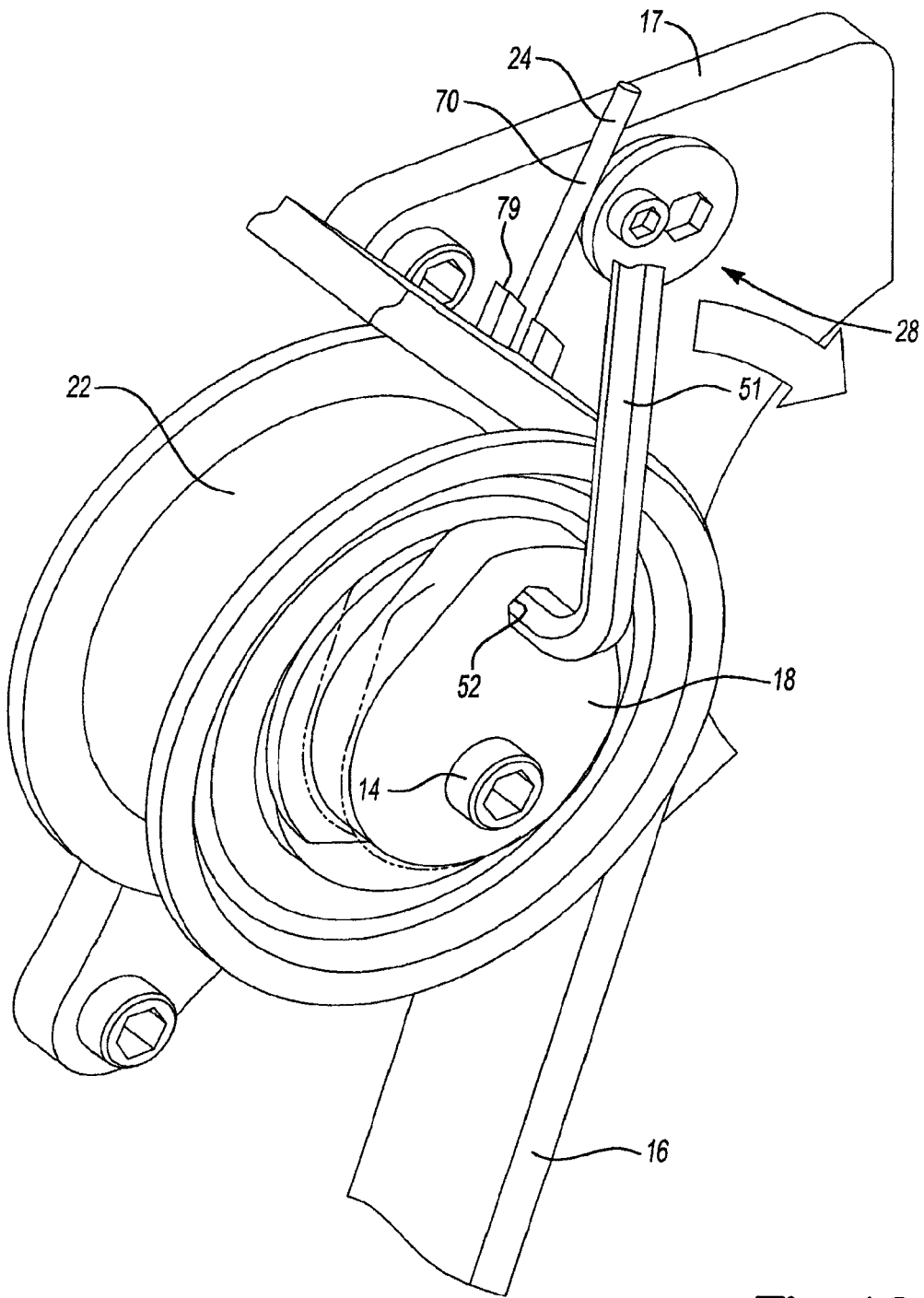

The pivot shaft 18 has an adjustment tool receiving aperture 50 which is shown on an extension portion of the pivot shaft flange 36. The adjustment tool receiving aperture 50 is configured to receive an adjustment tool 51 (shown in FIGS. 9 and 10). In the exemplary embodiment shown, the adjustment tool receiving aperture 50 has a hexagonal shape and the adjustment tool 51 is an Allen Key, however any other suitable shape and any other suitable tool may be used. To adjust the rotational position of the tensioner arm pivot axis 46, the pivot shaft fastener 14 is first loosened as necessary from the base plate 17, as illustrated by rotation of the tool (eg. an Allen key) inserted into the fastener 14 in the direction shown in FIG. 9. Preferably, the pivot shaft fastener 14 is loosened by as little as possible so as to keep the pivot shaft 18 as normal as possible relative to the face of the engine block 12 to which it is mounted. Once loosened, the adjustment tool 51 is used to rotate the pivot shaft 18 (and therefore the tensioner arm pivot axis 46) about the pivot shaft rotation axis 42 until it reaches a selected position. Once it is in the selected position, the pivot shaft fastener 14 may be tightened to fix the positions of the pivot shaft 18 and the tensioner arm pivot axis 46.

With reference to FIG. 5b, the tensioner arm 20 has a sleeve portion 51-1 that is rotatably mounted to the tensioner arm mounting surface 44 on the pivot shaft 18 via a sleeve bearing shown at 52. The tensioner arm 20 is captured distally on the pivot shaft 18 by the pivot shaft flange 36, and is captured proximally by a tensioner arm limit surface 54 on a spring bearing ring 56 that is fixedly connected (eg. by welding) to the pivot shaft 18. The spring bearing ring 56 assists in capturing the tensioner spring 24.

A bearing washer 57 may be provided between the distal end of the sleeve portion 51-1 of the tensioner arm 20 and the pivot shaft flange 36 to reduce friction that would inhibit the rotation of the tensioner arm 20 during use of the tensioner 10. The proximal end of the sleeve portion 51-1 may be manufactured with a relatively small contact area shown at 58, so that there is relatively little friction generated between it and the tensioner arm limit surface 54.

The tensioner arm 20 includes a pulley mounting surface 60 which is centered about a pulley axis 62. The pulley 22 mounts rotatably to the pulley mounting surface 60, via a bearing 64, and thus pivots about the pulley axis 62. The tensioner arm 20 is sized so that the pulley axis 62 is spaced from the tensioner arm pivot axis 46 by a selected amount based on, among other things, the amount of travel that is desired to be provided for the tensioner arm 20. The axes 62, 46 and 42 can also be seen in the plan view in FIG. 2.

The pulley 22 may have any suitable configuration. For example, the pulley 22 shown in the figures includes a belt engagement surface 66 (FIG. 5A) and first and second flange portions 66a and 66b (FIG. 5A) which are provided to prevent the belt 16 from working its way off the pulley 22 during use.

The tensioner spring 24 is held in a spring chamber 67 that is defined in part by the tensioner arm 20 and in part by the spring bearing member 56. Referring to FIG. 2, the tensioner spring 24 provides a biasing force that urges the tensioner arm 20 in a first direction (towards the belt 16) so as to provide a selected amount of tension in the belt 16. In the embodiment shown in the figures, the tensioner spring 24 is a torsion spring and has a first end 68 and a second end 70. The first end 68 of the tensioner spring 24 is positioned in a first end slot 72 (FIG. 6) provided on the tensioner arm 20. The second end 70 of the tensioner spring 24 extends outwardly from the spring chamber 67 through a second end slot 74 (FIGS. 6 and 5*a*) in the tensioner arm 20.

The second end slot 74 of the tensioner arm 20 is bounded by a first end wall 76 and a second end wall 78. The first and second end walls 76 and 78 serve as first and second limit surfaces which limit the angular range of travel that is available to the tensioner arm 20 towards and away from the belt 16. The first end wall 76 may be referred to as a free arm stop and limits the travel of the tensioner arm 20 in the first direction (ie. towards or into the belt 16). The second end wall 78 may be referred to as a load stop and limits the travel of the tensioner arm 20 in a second direction (away from the belt 16).

Figure 7:
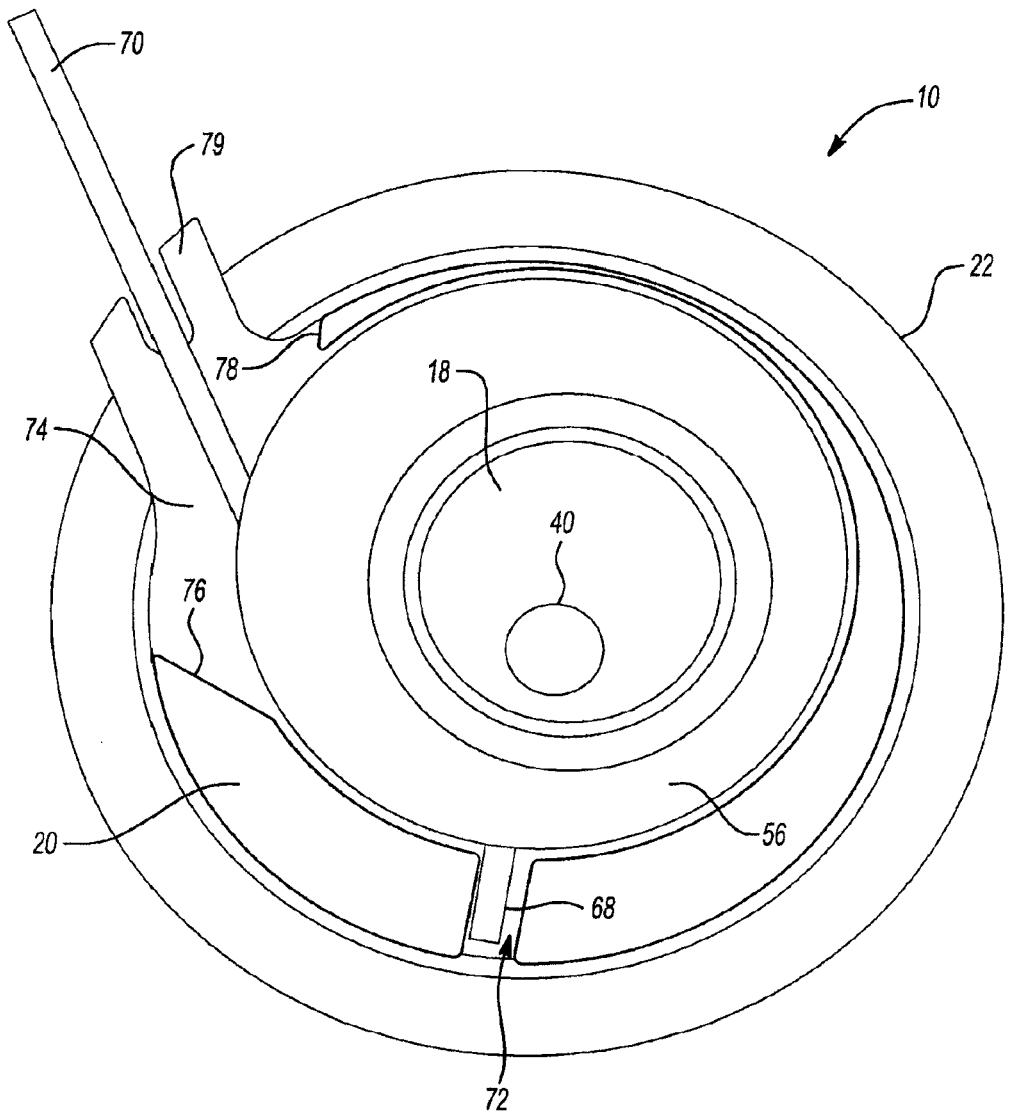
FIG. 7 is a plan view of the underside of the tensioner shown in FIG. 1, showing the spring end in a nominal position.

During use, the tensioner 10 may be adjusted so that the second end 70 of the spring 24 is positioned so that it is centered relatively to a marker shown at 79 as shown in FIG. 7. In this position, the spring 24 causes the tensioner arm 20 to apply a particular tensioning force on the belt 16. In situations where the tension in the belt 16 decreases (eg. due to thermal contraction of the engine) the biasing force of the tensioner spring 24 drives the tensioner arm 20 in the direction into the belt 16 (ie. in the first direction, towards the free arm stop 76). As the tensioner arm 20 moves towards the free arm stop 76, the spring 24 unwinds by some amount and so the biasing force it exerts on the tensioner arm 20 is correspondingly reduced, until equilibrium is reached between the tensioner arm 20 and the belt 16. In situations where the tension in the belt 16 increases (eg. due to thermal expansion of the engine) the belt 16 tightens, driving the tensioner arm 20 in the second direction, towards the load stop 78. As the tensioner arm 20 rotates towards the load stop 78, it winds the spring 24, thereby increasing the biasing force exerted by the spring 24 on the tensioner arm 20 until equilibrium is reached between the tensioner arm 20 and the belt 16.

Figure 22:
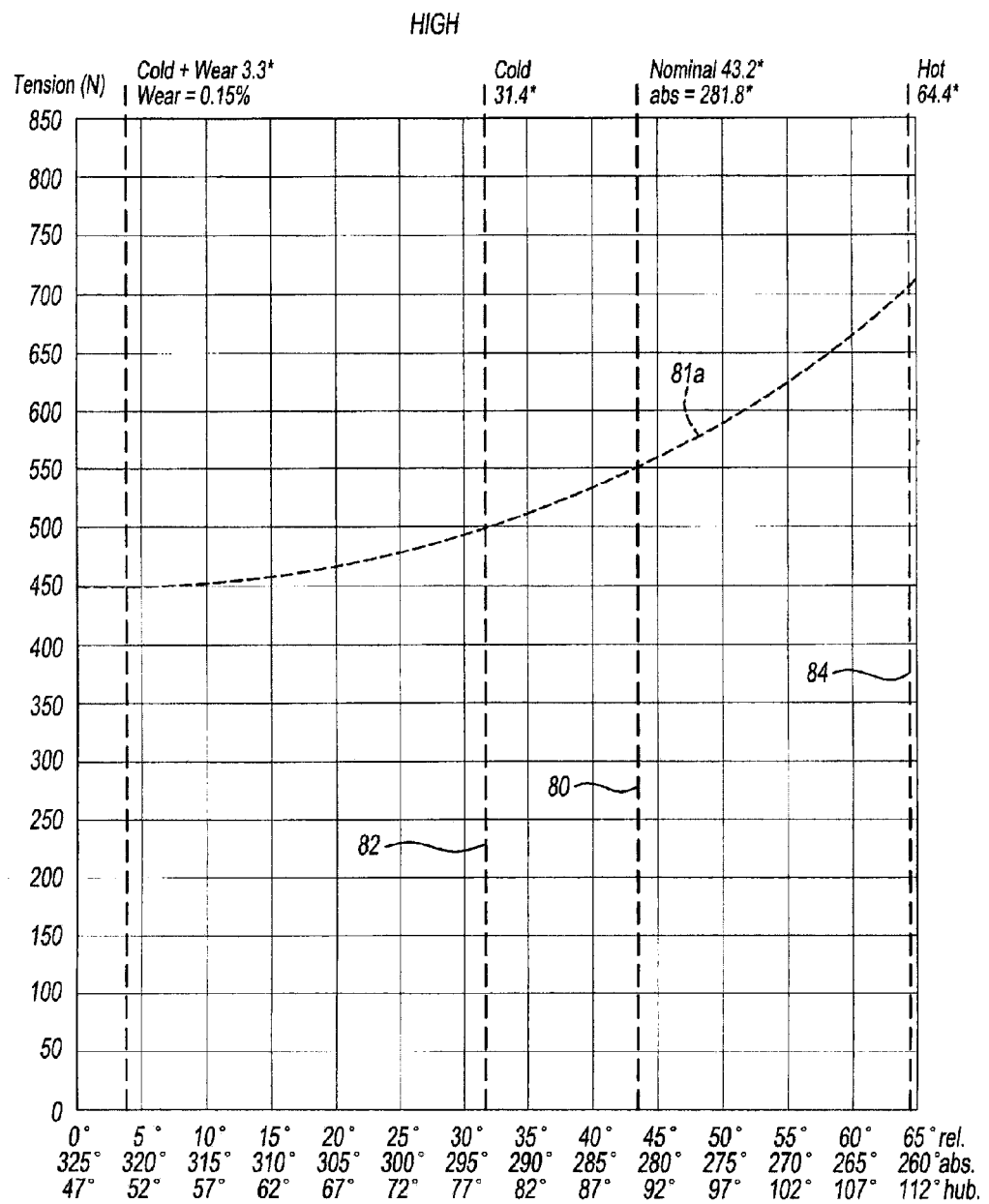
FIG. 22 is a graph illustrating the tension profile for the tensioner when the spring end is adjusted in the winding direction.
Figure 23:
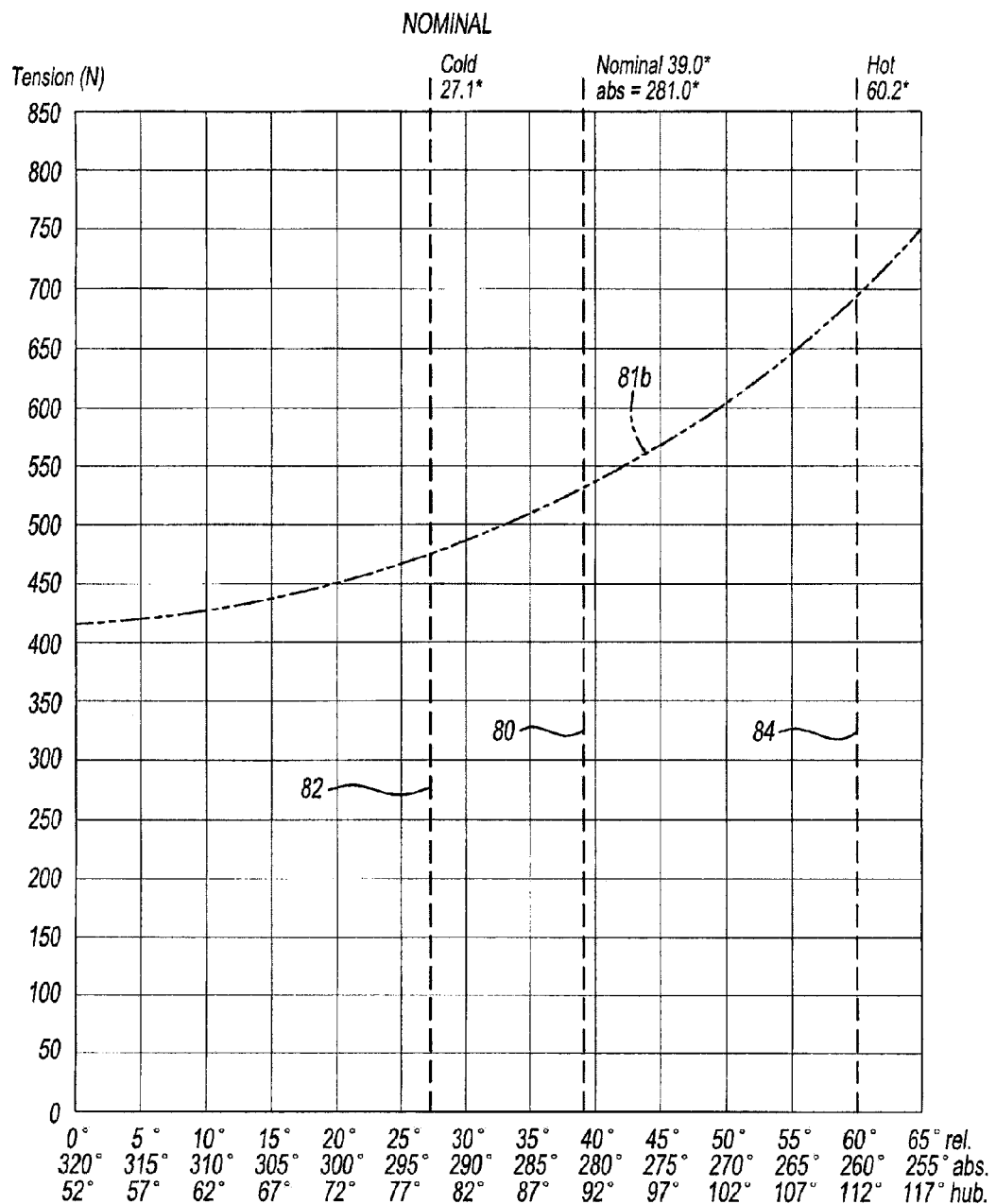
FIG. 23 is a graph illustrating the tension profile for the tensioner when the spring end is adjusted in the nominal position.

The graph shown in FIG. 23 shows a plot of the tension in the belt 16 as the tensioner arm 20 rotates through a range of motion between its free arm stop position and its load stop position. The tension in the belt 16 is represented by a curve shown at 81*b* to distinguish it over the tension profile curves shown at 81*a* and 81*c* in FIGS. 22 and 24 respectively. Shown in the graph is a vertical dashed line 80, which identifies the belt tension provided and the angular position of the tensioner arm 20 when the engine block 12 is at a particular nominal temperature (eg. 25 degrees Celsius). Also shown in the graph is a vertical line 82 which identifies the belt tension and the angular position of the tensioner arm 20 when the engine block 12 is at a particular low temperature, eg. −40 degrees Celsius. Also shown is a vertical line 84 which identifies the belt tension and the angular position of the tensioner arm 20 when the engine block 12 is at a particular high temperature, (eg. 120 degrees Celsius). It will be noted that the tension curve 81*b* shown is specific to the particular tensioner 10 shown in the figures, at the adjustment shown in FIG. 7, and mounted on a particular engine for use with a particular belt 16. The shape of the curve 81*b* will vary depending on variations in any of these aforementioned elements. Throughout this disclosure, the term engine temperature and engine block temperature are intended to mean substantially the same thing with respect to the operation and performance of the tensioner 10.

Figure 6:
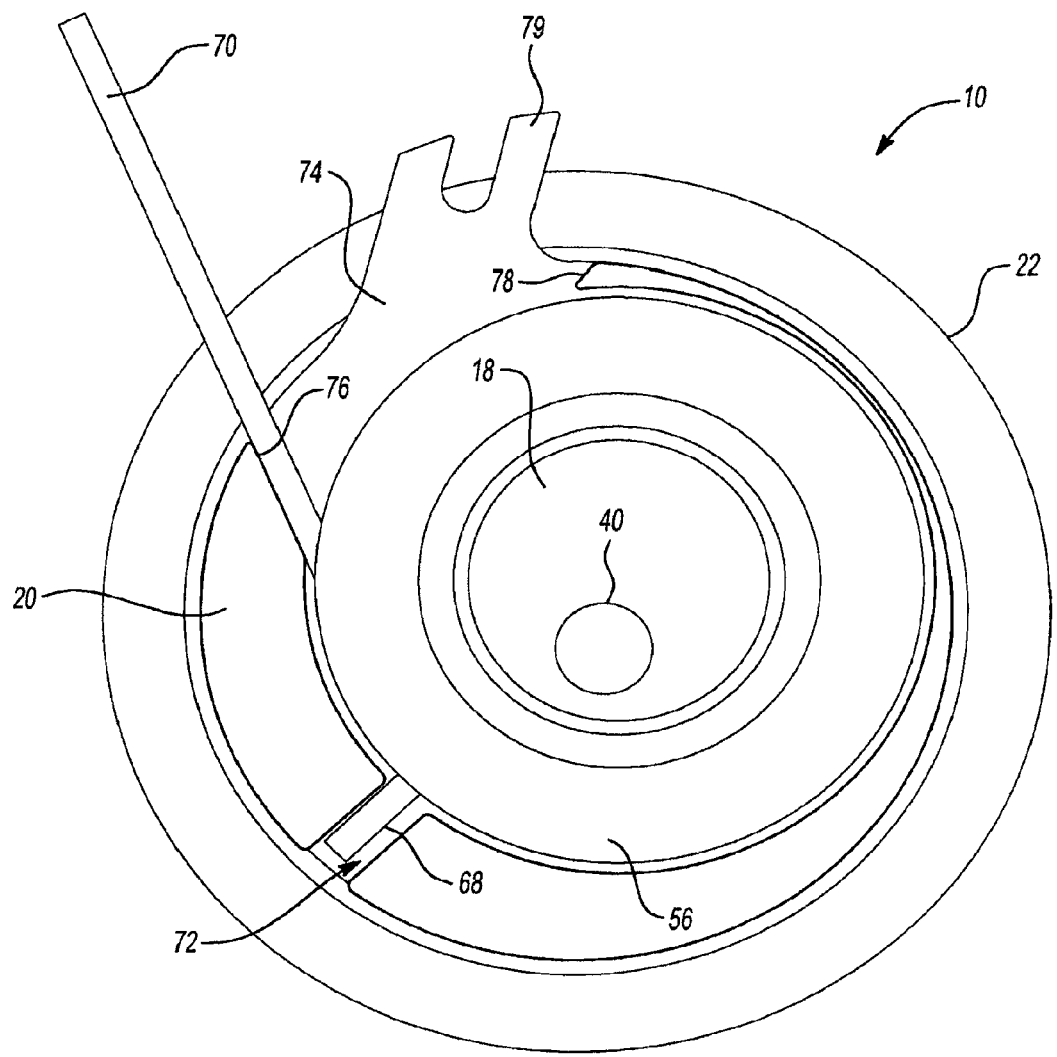
FIG. 6 is a plan view of the underside of the tensioner shown in FIG. 1, showing the spring end against a free arm stop.
Figure 24:
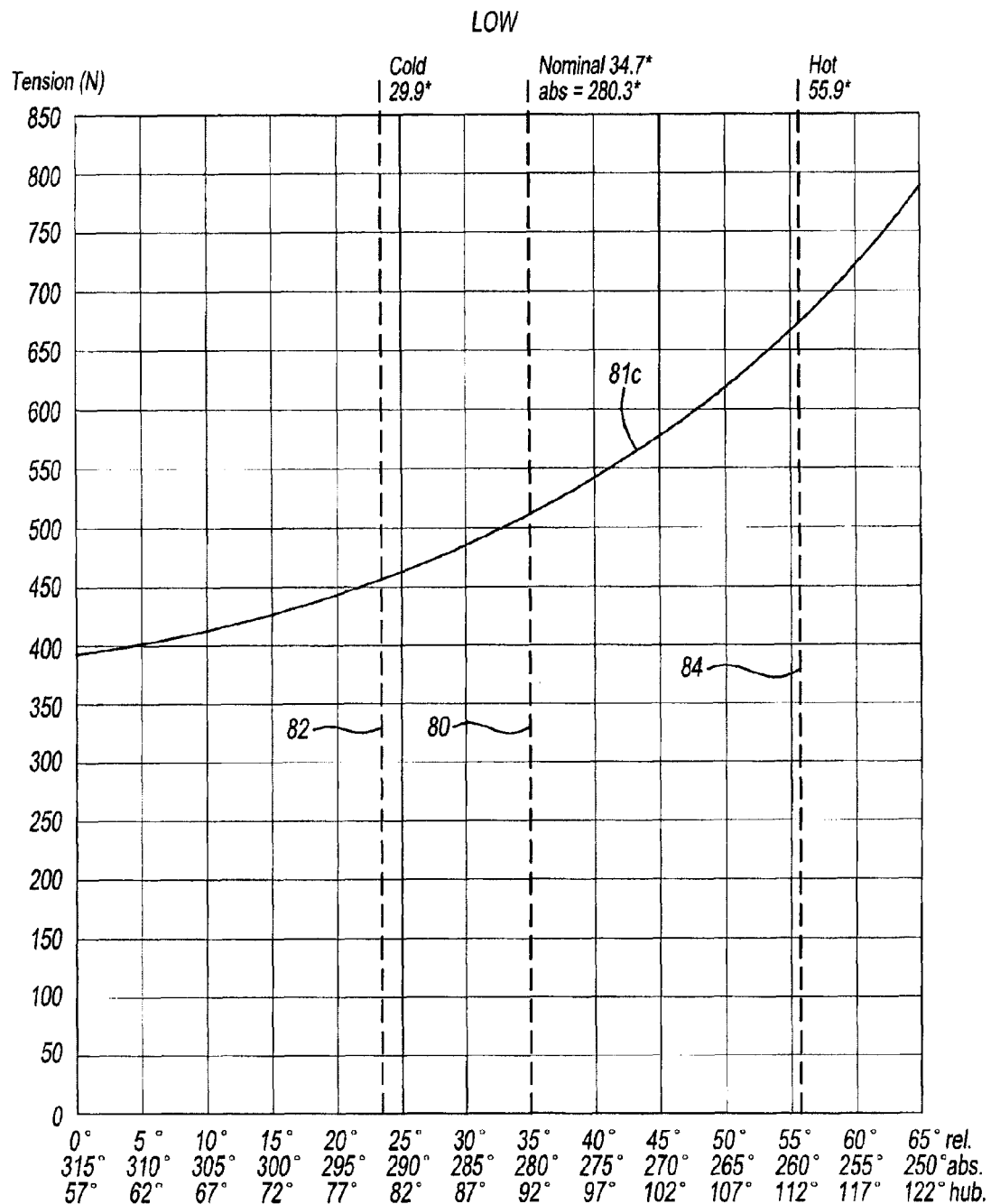
FIG. 24 is a graph illustrating the tension profile for the tensioner when the spring end is adjusted in the unwinding position.

With reference to FIG. 6, if the second end 70 of the spring 24 were to be adjusted in a direction to unwind the spring 24 by a selected amount, without changing the position of the tensioner arm pivot axis 46 on the engine block 12, the tension curve provided by the tensioner 10 on the belt 16 would be as shown at 81*c* in FIG. 24. Again the engine block nominal temperature (eg. 25 degrees Celsius) is represented by vertical line 80, the cold temperature (eg. −40 degrees Celsius) is represented by line 82 and the high temperature (eg. 120 degrees Celsius) is represented by line 84.

Figure 8:
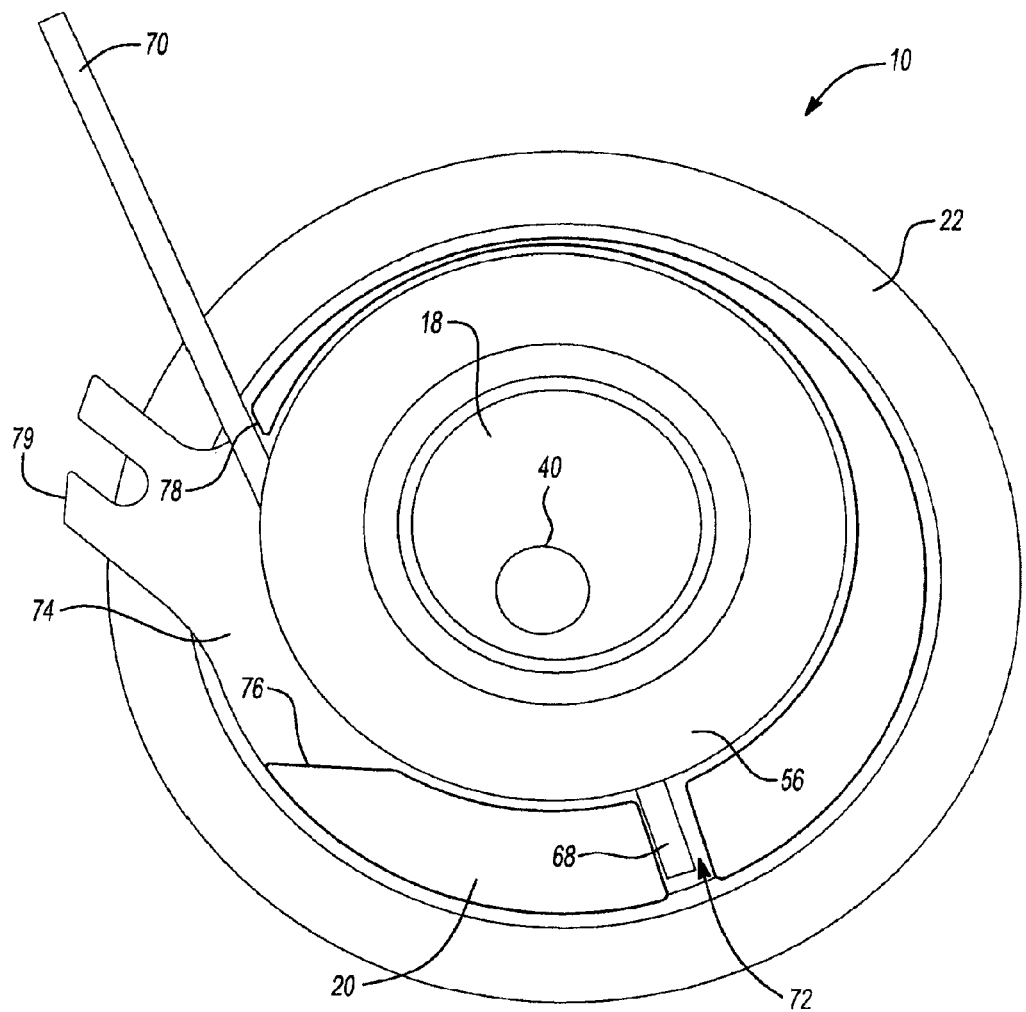
FIG. 8 is a plan view of the underside of the tensioner shown in FIG. 1, showing the spring end against a load stop.

With reference to FIG. 8, if the second end 70 of the spring 24 were to be adjusted in a direction to wind the spring 24 by a selected amount, without changing the position of the tensioner arm pivot axis 46 on the engine block 12, the tension curve provided by the tensioner 10 on the belt 16 would be as shown in FIG. 22. Again the engine block nominal temperature (eg. 25 degrees Celsius) is represented by vertical line 80, the cold temperature (eg. −40 degrees Celsius) is represented by line 82 and the high temperature (eg. 120 degrees Celsius) is represented by line 84.

Figure 25A:
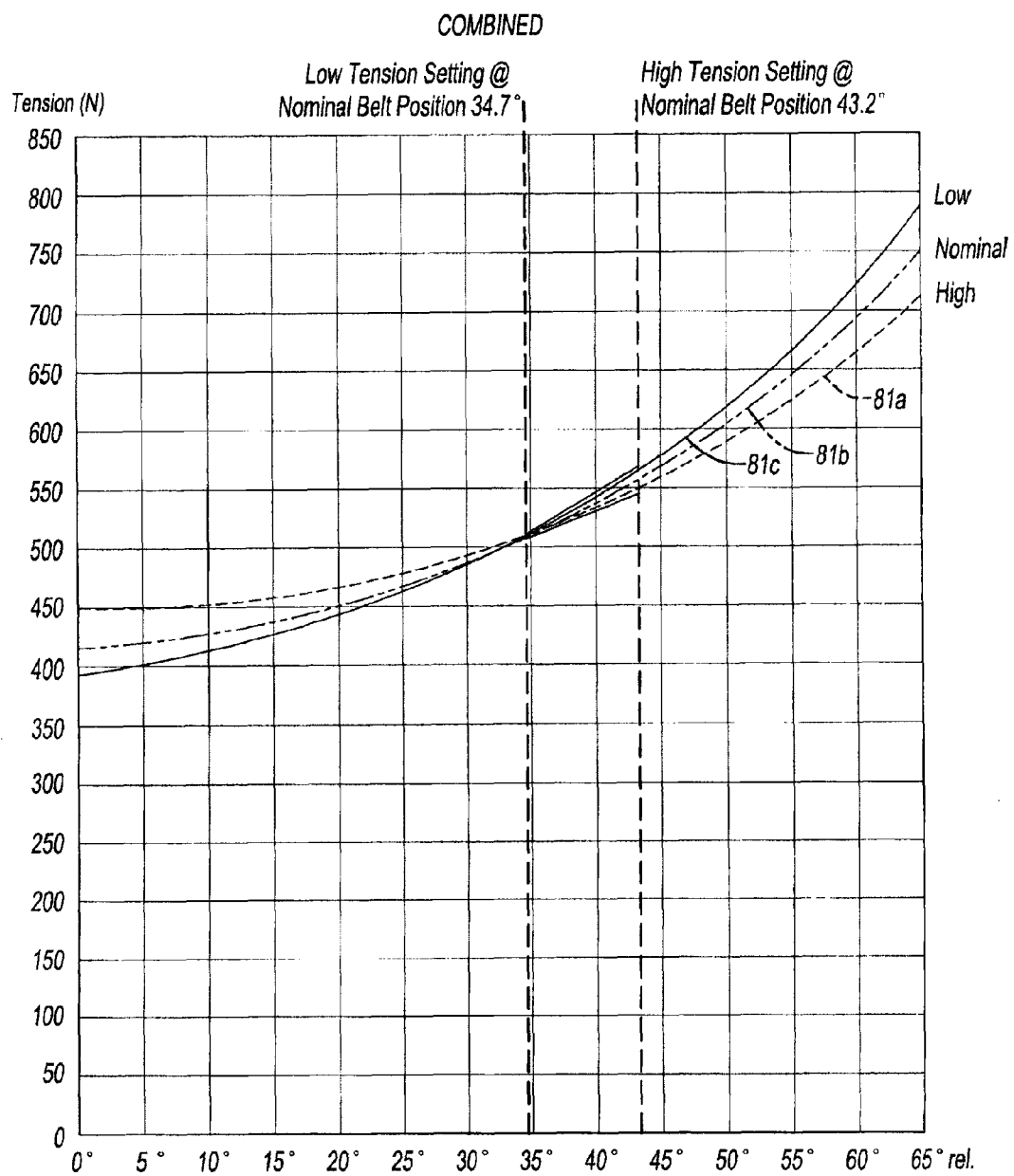
FIG. 25a is a graph illustrating the three tension profiles for the tensioner shown in FIGS. 22-24.
Figure 25B:
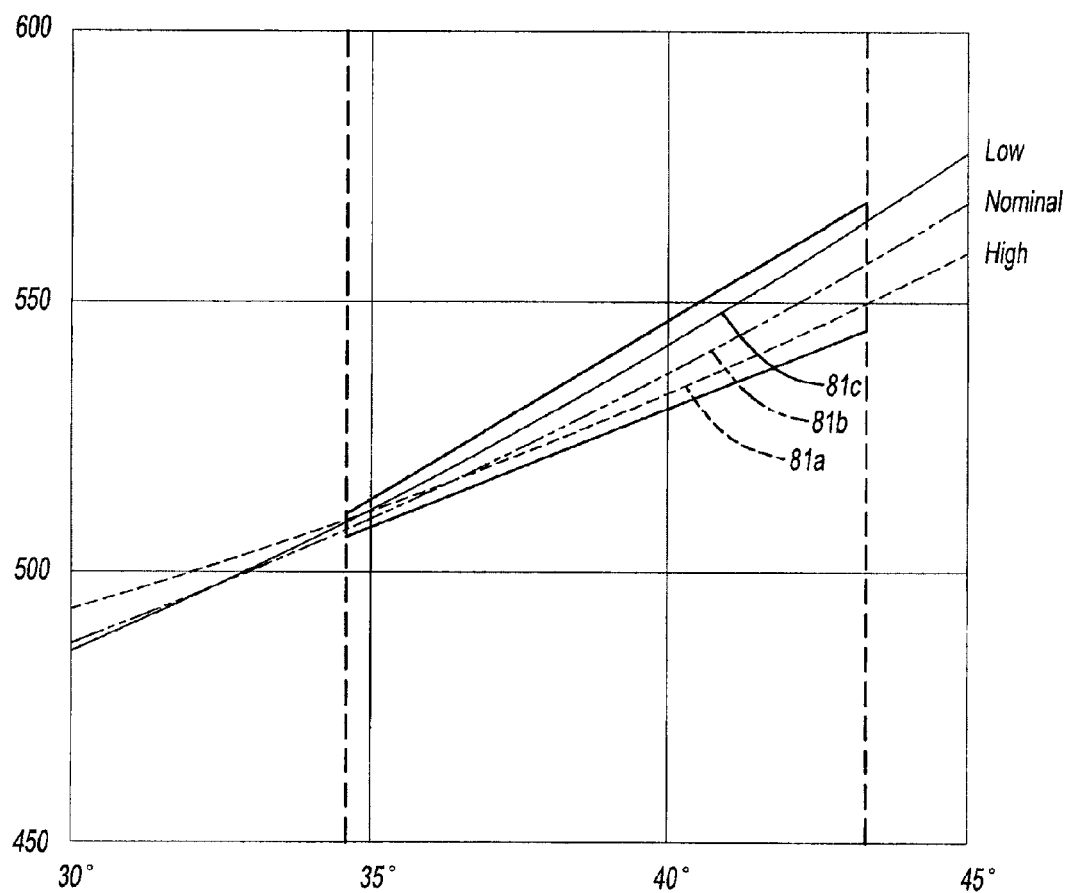

FIG. 25*a* and FIG. 25*b* (which is a magnified view of a portion of FIG. 25*a*), show the three tensioner profile curves 81*a*, 81*b* and 81*c* all positioned on a single graph. It can be seen that, for the particular tensioner 10 shown in FIGS. 6-8, the belt tension profile curve 81*c* is lower than the curve 81*b* throughout a portion of the range of angular positions of the tensioner arm 20, up to approximately an angle of about 33 degrees for the tensioner arm 20. At approximately this angle, the curves 81*a* and 81*b* intersect and beyond this angle the belt tension profile curve 81*a* is higher than the belt tension profile curve 81*b*. This means that when the tensioner arm 20 is beyond about 33 degrees, moving the spring end 70 from the nominal position in the unwinding direction actually increases the belt tension. This is because of the particular geometry involved with this particular tensioner with the pivot shaft 18 adjusted to a particular angle, with this particular belt on this particular engine. It can also be seen from FIGS. 25*a* and 25*b* that the curve 81*a* is higher than the curve 81*b* for tensioner arm angles that are below about 36.5 degrees, and that beyond this angle the curve 81*a* is below the curve 81*b*. This means, that at beyond a tensioner arm angle of about 36.5 degrees, adjusting the second end 70 from the nominal position in the winding direction decreased the belt tension.

In general, a high belt tension has both advantages and drawbacks. A high tensioning force on the belt 16 reduces the likelihood that torsional vibration in the engine will generate resonance in the belt 16. Torsional vibration results from cyclical variations (eg. sinusoidal variations) that occur in the speed of the crankshaft during operation of the engine. These speed variations in the crankshaft are the result of the energy transfer that takes place between the reciprocating motion of the pistons and connecting rods, and the rotary motion of the crankshaft. These cyclical speed variations can generate resonance in the belt 16. Resonance in the belt 16 can have several negative consequences. One such consequence in embodiments wherein the belt 16 is a timing belt is that, if the amplitude of the resonance is too great, it could potentially cause the belt 16 to lose its timing relative to the cam shafts and to skip, which as is well known in the field, would be disastrous for most engines. It is therefore important to reduce the likelihood of belt tooth skip on a timing belt, such as belt 16. Additionally, the resonance even when not severe enough to cause belt tooth skip can reduce the life of the belt 16. By keeping the belt 16 under relatively high tension, the effects of torsional vibration are dampened, thereby reducing the likelihood of resonance.

An important drawback, however, of a high belt tension, however, is that it increases the parasitic loss of engine power associated with the belt, since the engine must work relatively harder just to rotate when the belt tension increases. Furthermore, an excessively high belt tension can negatively impact the life of the belt 16.

The micro-adjustment mechanism 28 permits the adjustment of the second end 70 of the spring 24 as desired to control the spring tension profile of the tensioner 10. Significantly, the micro-adjustment mechanism 28 permit this adjustment to take place without the need to loosen the pivot shaft fastener 14. This can be advantageous during installation of the tensioner 10 on the engine 13 and during subsequent testing of the engine 13. When the tensioner 10 is mounted to the engine 13, there will be some variation in the precise orientation and position of the tensioner arm 20 relative to the belt 16, some variation in the biasing force of the spring 24, as well as other tolerances. In order to compensate for these variables and to account for other effects such as the ambient temperature in the engine assembly facility relative to the nominal temperature for which the engine is designed to operate, the position of the second end 70 of the spring 24 can be adjusted using the micro-adjustment mechanism 28 so as to move the tension profile towards the profile shown by curve 81c in FIG. 24 or so as to move the tension profile towards profile shown by curve 81a in FIG. 22.

In some prior art tensioners, if the tensioner was not positioned within an acceptable range of adjustment, the pivot shaft fastener on the tensioner needed to be loosened so that the tensioner could be readjusted. However, with some prior art tensioners, the positioning of the pivot shaft is lost once the pivot shaft fastener is loosened, which means that a significant portion of the installation process would need to be repeated. Furthermore, because the installation process is substantially being repeated, there is a possibility that the second installation attempt of the tensioner would still result in an unsuitable tension profile. Moreover, if an acceptable tension profile could not be achieved after two or three attempts to install the prior art tensioner, the engine assembly company's policy may be to either reject the tensioner and install a new tensioner in its place, or in more extreme cases the entire engine may be reworked, adding significantly to the assembly time and cost associated with that engine. By contrast, with the tensioner 10 in accordance with embodiments of the present invention, if the tensioner 10 did not provide a suitable tension profile after being initially installed on the engine 13, the micro-adjustment mechanism 28 could be adjusted in an attempt to bring the tension profile within an acceptable range, thereby eliminating the need to essentially reinstall the tensioner 10. It will be noted that this is not to say that the micro-adjustment mechanism 28 need necessarily be capable of compensating for every single poor installation of the tensioner 10. It is simply to say that the micro-adjustment mechanism 28 permits some tensioners 10 to be adjusted and brought within acceptable performance parameters quickly and easily and without necessitating the loosening of the fastener 14 and subsequent reinstallation of the tensioner 10.

Figure 2A:
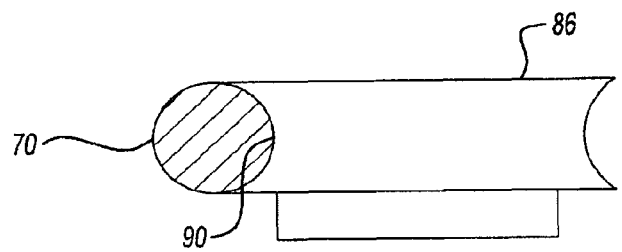
FIG. 2a is an elevation view of a portion of the tensioner shown in
FIG. 2.

The micro-adjustment mechanism 28 may take any suitable form. For example, in the embodiment shown in FIG. 2, the micro-adjustment mechanism 28 includes a cam 86 that is fixedly mountable to the base plate 17 (via cam fastener 88) at any desired angular position. The cam 86 is shown in a high tension position in FIG. 2, a nominal tension position in FIG. 3 and a low tension position in FIG. 4. As shown in FIG. 2a, the cam 86 has an edge face 90 is channel-shaped so that it captures the second end 70 of the spring 24, and inhibits the second end 70 from sliding off the edge face 80 inadvertently.

Furthermore, the cam 86 may further include an adjustment tool receiving aperture 92 for receiving a cam adjustment tool (not shown), which may be any suitable tool such as an Allen key. To adjust the cam 86, the fastener 88 is loosened as necessary, the tool (not shown) may be use to rotate the cam 86 as desired, and the fastener 88 is then tightened.

Figure 3:
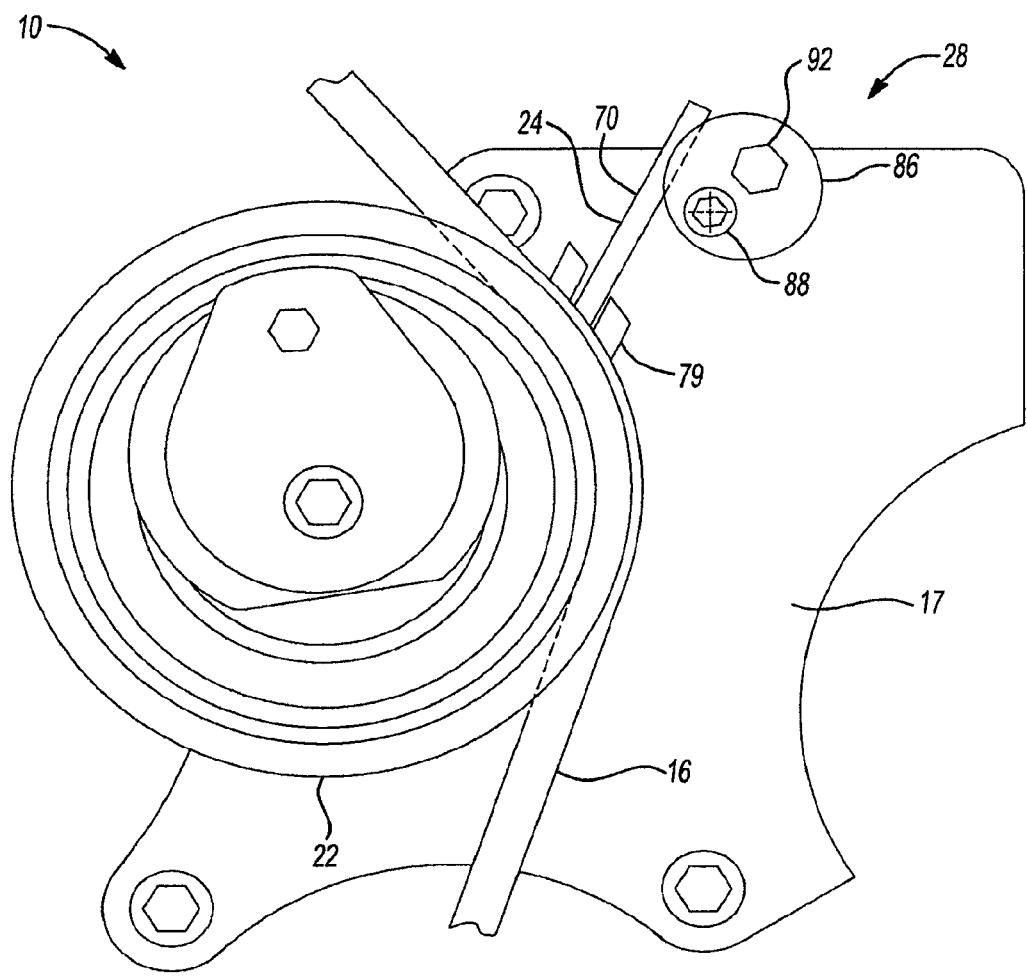
FIG. 3 is a plan view of the tensioner shown in FIG. 1, with the spring end in a second or nominal position.
Figure 4:
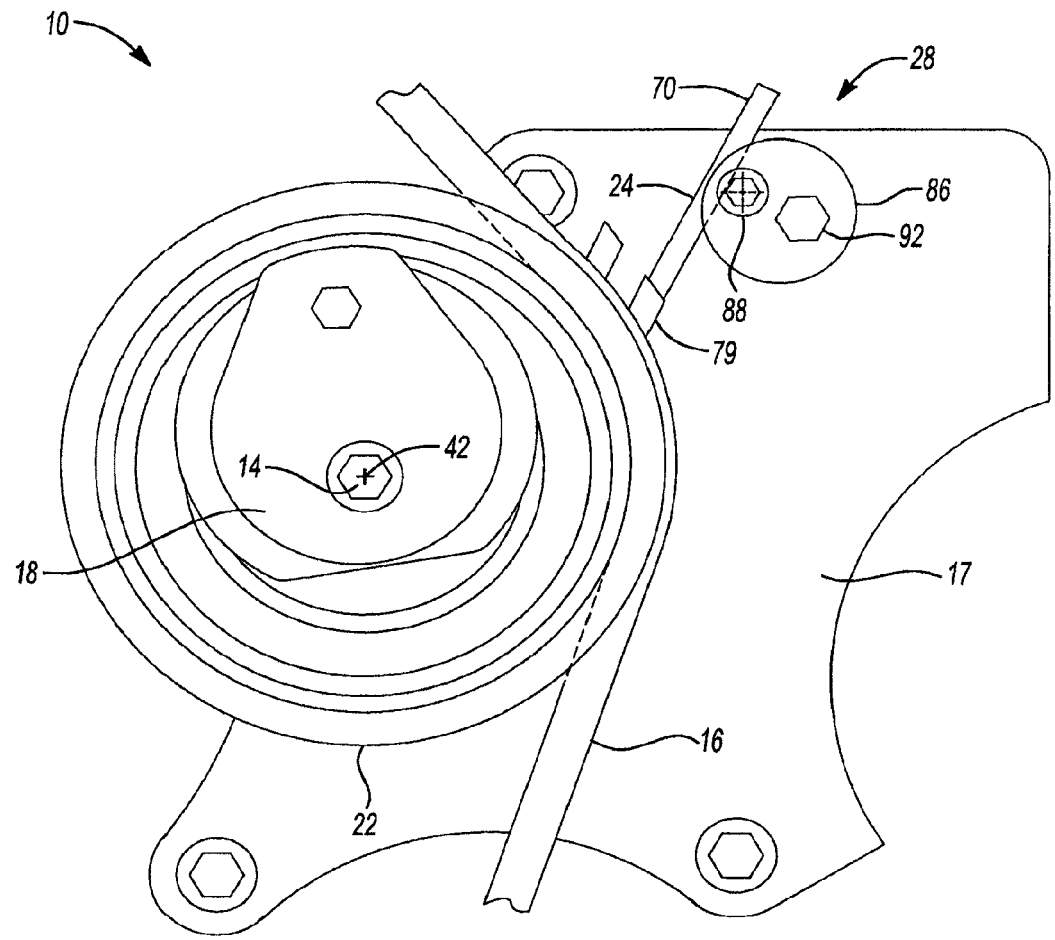
FIG. 4 is a plan view of the tensioner shown in FIG. 1, with the spring end in a third position, urged in an unwinding direction.

It will be noted that the micro-adjustment mechanism 28 shown in FIGS. 2, 3 and 4 is a manually adjusted mechanism, is a rotary mechanism, and is infinitely adjustable over its range of adjustment.

Figure 11:
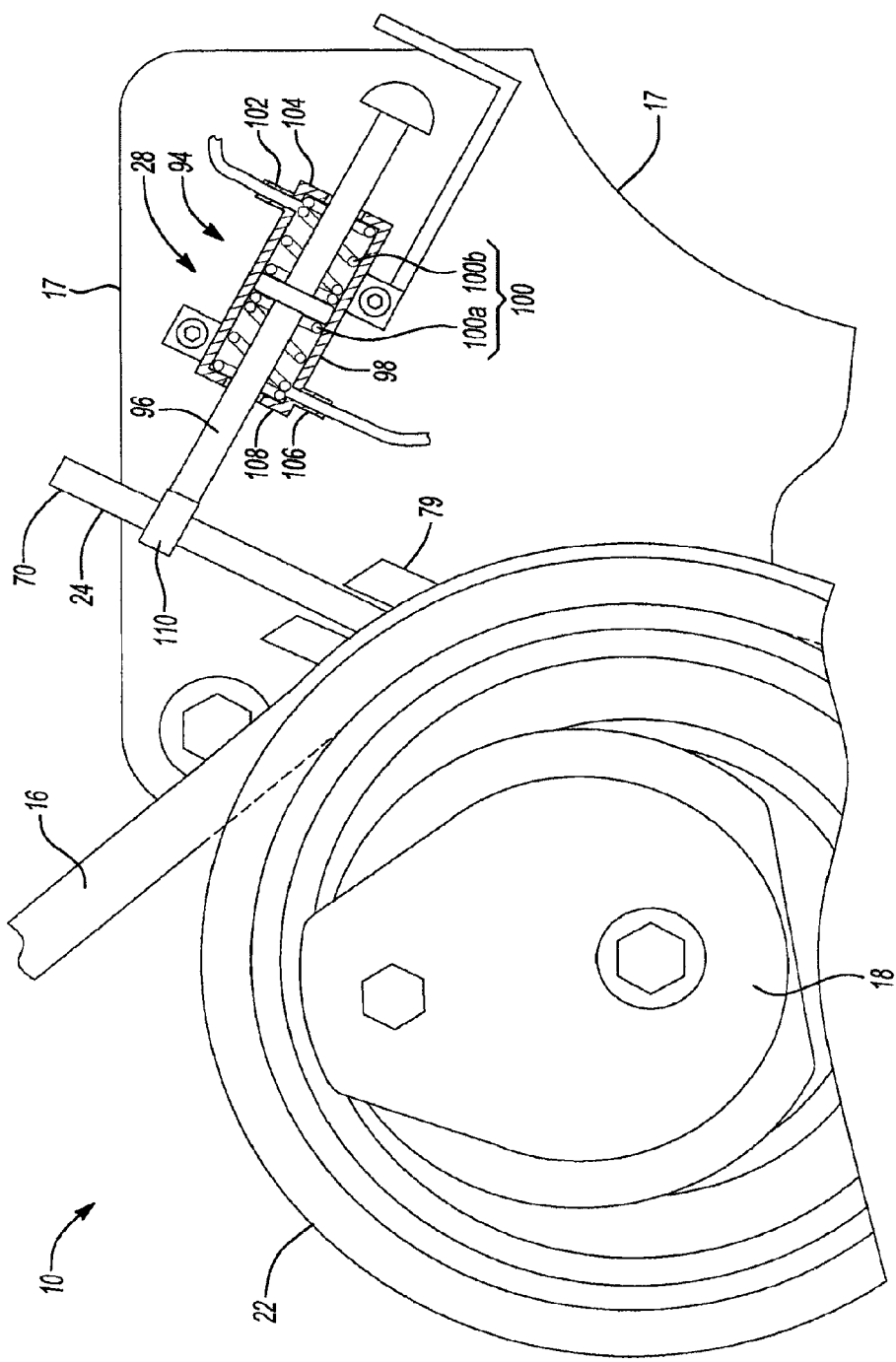
FIG. 11 is a plan view of the tensioner shown in FIG. 1, showing an alternative actuator that is fluid driven.

It is alternatively possible to provide a micro-adjustment mechanism 28 that movable between two or more discrete positions, such as the micro-adjustment mechanism 28 shown in FIG. 11. The micro-adjustment mechanism 28 in FIG. 11 includes an actuator 94 that is a linear actuator and that is moved between a position and a second position using fluid pressure. More specifically, the actuator 94 includes a piston 96 in a fluid chamber 98, and an optional biasing structure 100 that is made up in this instance of first and second springs 100a and 100b. The chamber includes a first port 102 at a first end 104 and a second port 106 at a second end 108. Fluid at a first pressure is provided at the first port 102 and fluid at a second pressure is provided at the second port 106. By controlling the pressures of the fluid at the first and second ports 102 and 106 the piston 96 can be moved to the first or second positions. Upon venting the first and second ports 102 and 106 the springs 100a and 100b bring the piston 96 back to a home position which constitutes a third position for the actuator 94. The first and second positions may correspond to high tension and low tension settings respectively for the second end 70 of the spring 24. The third position may correspond to the nominal setting for the second end 70.

The piston 96 extends out from the housing and connects to the second end 70 of the spring 24. The connection to the second end 70 of the spring 24 may be by means of a spherical rod end shown at 110, which incorporates a spherical bushing so that the connection can accommodate angular changes that take place between the second end 70 of the spring 24 and the piston 96 as the piston 96 extends and retracts. The spherical rod end may be provided by igus Inc., PO BOX 14349 East Providence, R.I. 02914.

It will be noted that the actuator 94 shown in FIG. 11 may be either a pneumatic actuator or a hydraulic actuator.

Figure 12:
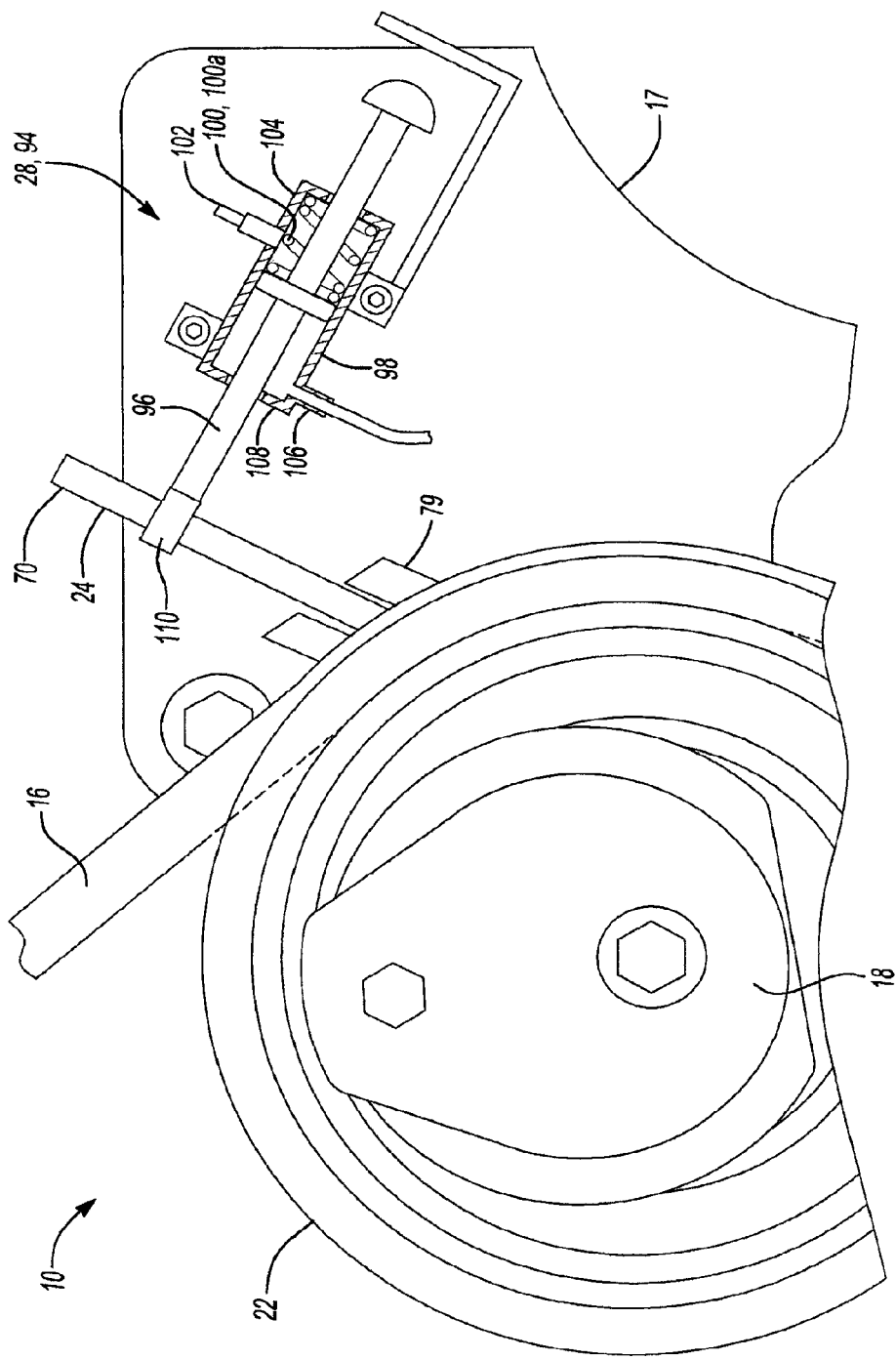
FIG. 12 is a plan view of the tensioner shown in FIG. 1, showing another alternative actuator that is fluid driven.

Reference is made to FIG. 12, which shows the actuator 94 but with some variations in configuration relative to the embodiment shown in FIG. 11. More specifically, the first port 102 is a vent port, and as a result the first fluid pressure is atmospheric pressure. Additionally, the biasing structure 100 includes only a first spring 112.

Figure 13:
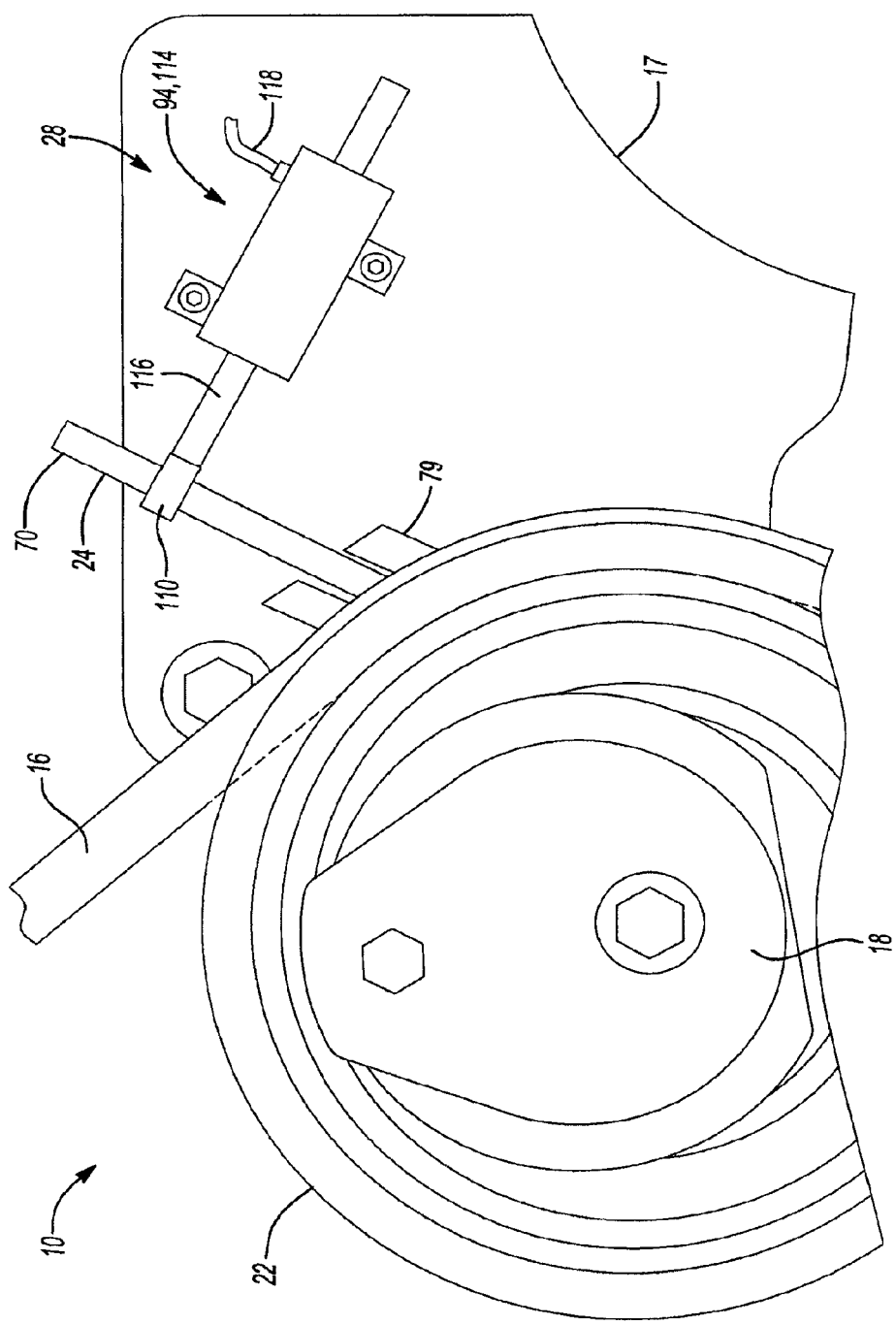
FIG. 13 is a plan view of the tensioner shown in FIG. 1, showing an alternative actuator that includes a solenoid.

Reference is made to FIG. 13, wherein the actuator 94 is an electromagnetic solenoid 114 (which may be referred to simply as a solenoid 114) instead of a fluid driven actuator as shown in FIGS. 11 and 12. In the embodiment shown in FIG. 13, the solenoid 114 drives an actuation member 116 which engages the second end 70 of the spring 24. The solenoid 114 may be configured to latch and lock in each of its available positions. An electrical conduit 118 is shown which connects the solenoid 114 to a suitable electrical source, such as the electrical system in the vehicle in which the engine is installed.

A spherical rod end 110 is shown connecting the second end 70 of the spring 24 and the actuation member 116.

The solenoid 114 may be any suitable type of solenoid, and may be configured to be positionable in two positions, or may be configured to be positionable three or more positions.

Figure 14:
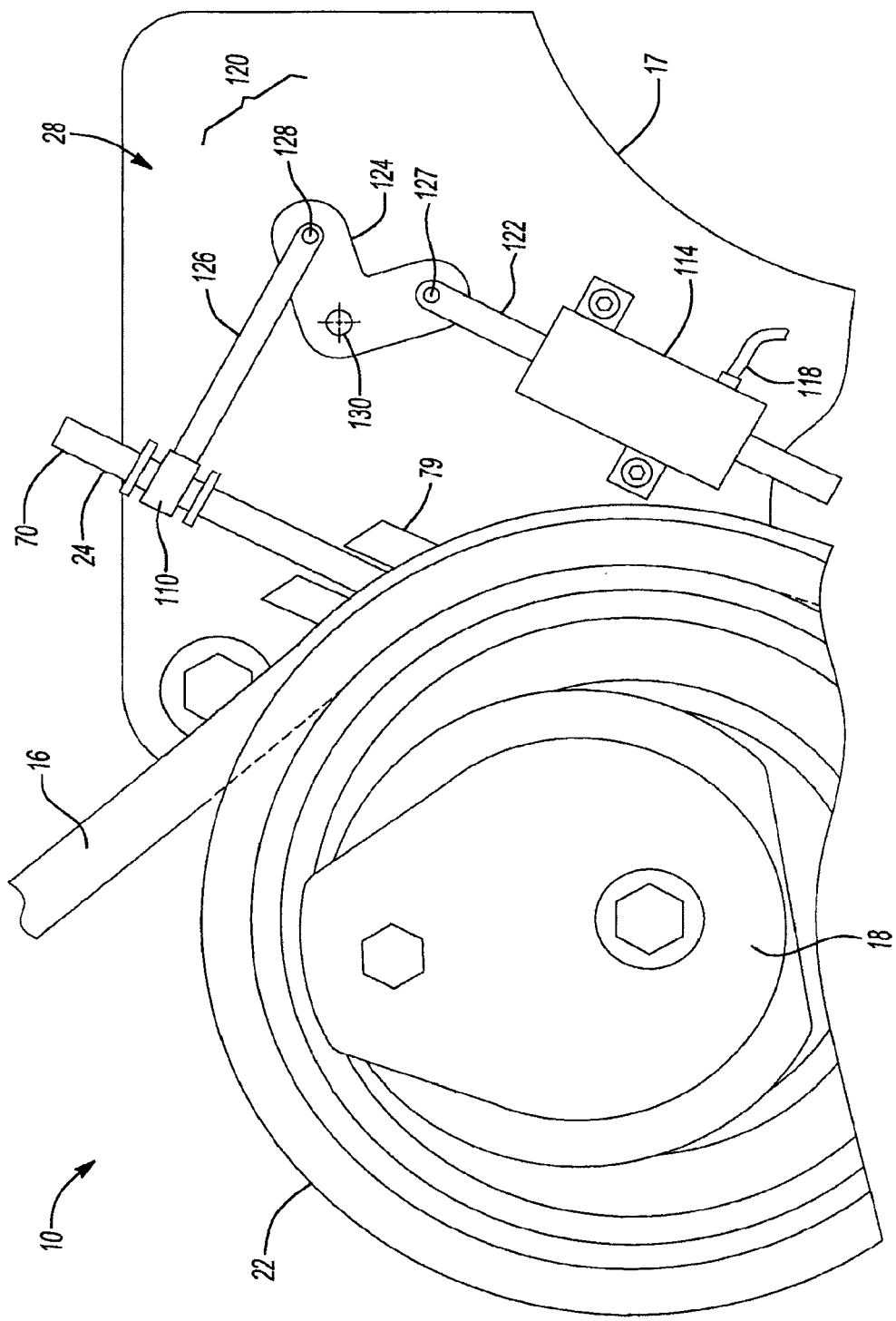
FIG. 14 is a plan view of the tensioner shown in FIG. 1, showing another alternative actuator that includes a solenoid with a mechanical linkage.

Reference is made to FIG. 14, which shows the solenoid 114 and the second end 70 of the spring 24 connected through a linkage 120. The linkage 120 includes a first rod 122, a pivot member 124 and a second rod 126. The first rod 122 is directly actuated linearly by the solenoid 114 and is connected by a pin joint 127 to the pivot member 124. The pivot member 124 is also connected to the second rod 126 by a pin joint 128. As the first rod 122 moves along a first direction, it causes the pivot member 125 to rotate about pivot axis 130, which in turn drives the second rod 126 to move along a second direction, which may be at any selected angle relative to the first direction. In the embodiment shown, the second rod 126 moves generally perpendicularly to the first rod 122. Thus, the linkage 120 may be used to configure the actuator 94 to operate through a selected angle in the event that there is not sufficient room to position the actuator 94 as shown in FIG. 13. Additionally, the moment arms of the pin joints 127 and 128 may be selected so that a mechanical advantage is provided by the linkage 120, thereby permitting a relatively smaller actuator 94 to be used in order to provide a selected force of actuation on the spring end 70.

In the embodiment shown in FIGS. 13 and 14, the solenoid may be configured so that it is energized to move in one direction (eg. the direction for winding the spring 24, which may be referred to as the winding direction) and is deenergized to move in the opposite direction (eg. the direction for unwinding the spring 24, which may be referred to as the unwinding direction). The solenoid 114 may have a biasing spring that is internal that biases it in the said opposite direction. Additionally or alternatively, the second end 70 of the spring 24 may be used to provide the biasing force to drive it in the unwinding direction.

Figure 15:
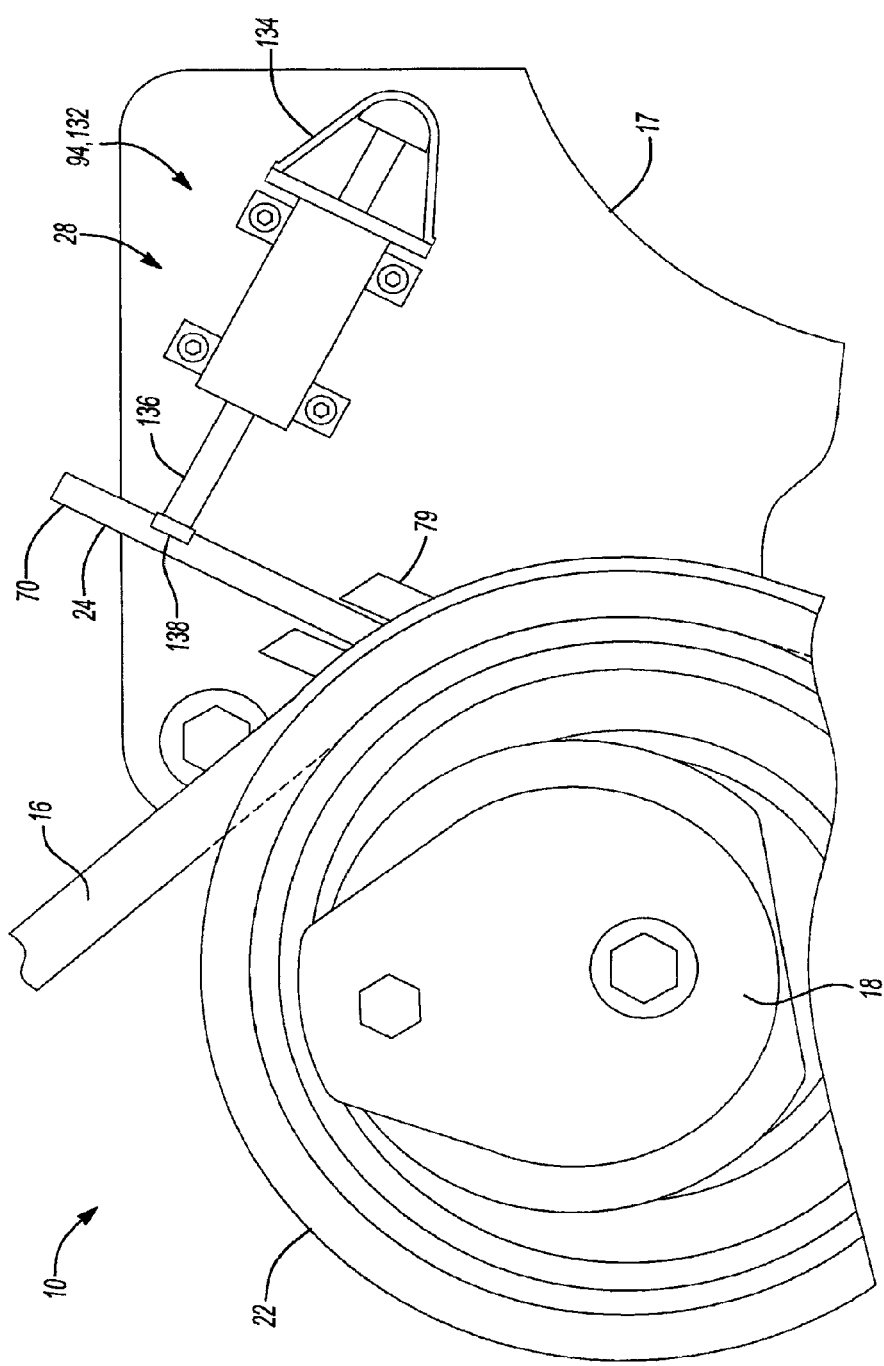
FIG. 15 is a plan view of the tensioner shown in FIG. 1, showing another alternative actuator that includes a passive shape memory alloy actuator.

Reference is made to FIG. 15, wherein the actuator 94 is a shape memory alloy actuator 132. The shape memory alloy actuator 132 includes a shape memory alloy member 134, which provides the driving force for moving the second end 70 in the winding direction. The shape memory alloy actuator 132 shown in FIG. 15 is a passive actuator and has a transition temperature that is selected to be within the operating range of temperatures of the engine 13 (eg. between –40 and 120 degrees Celsius), such as, for example 80 degrees Celsius. Above the transition temperature, the shape memory alloy member 134 changes its length and drives the actuation member shown at 136 from a first position to a second position to drive the second end 70 in the winding direction. Below the transition temperature, the shape memory alloy member 134 returns to the longer shape, which permits the second end 70 and optionally a biasing member (not shown) that is internal to the actuator 132 to drive the actuation member in the spring unwinding direction. In the embodiment shown in FIG. 15, the connection between the actuation member 136 and the second end 70 is made by a channel shaped end face 138 on the actuation member 136, which inhibits movement of the spring end in a direction that is out of the plane of the page in the view shown in FIG. 15, similar conceptually to the capturing shown in FIG. 2a via the channel shaped edge face 90 of the cam 86. Alternatively, the actuation member 136 could be provided with a spherical rod end, such as the rod end 110 shown in FIGS. 11-14.

Figure 16:
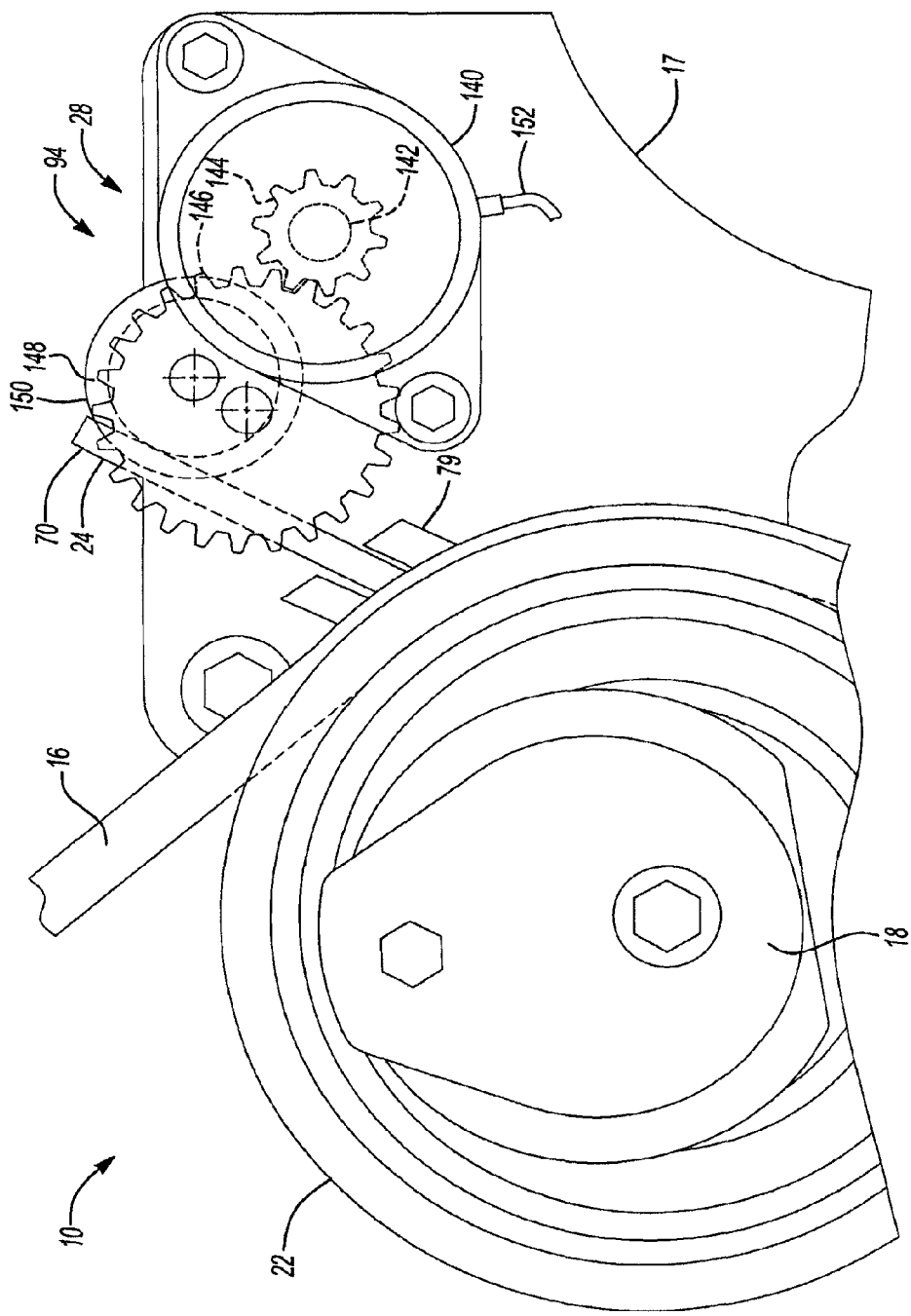
FIG. 16 is a plan view of the tensioner shown in FIG. 1, showing another alternative actuator that includes gearmotor.

Reference is made to FIG. 16, wherein the actuator 94 is a rotary actuator, and includes an electric motor 140 operatively connected to the actuation member, shown at 148. The motor 140, which has an output shaft 142 with a first gear 144 thereon. The first gear 144 may be a spur gear as shown. The first gear 144 drives a second gear 146, which may be configured to be larger than the first gear 144 so as to multiply the torque available from the motor 142. The second gear 146 has a cam 148 mounted thereon which provides a channel shaped edge face 150 for engaging the second end 70. An electrical conduit 152 may connect the motor 142 to an electrical source such as the electrical system for the vehicle. The motor 142 may be a bi-directional servomotor or the like, and may thus be substantially infinitely adjustable in position so that the second end 70 may be infinitely adjustable in position over a range between a low tension position and a high tension position. Optional gearmotor actuators that may be used as actuator 94 in FIG. 16 include those disclosed in U.S. Pat. No. 3,954,016, U.S. Pat. No. 4,131,306, U.S. Pat. No. 4,674,781, U.S. Pat. No. 4,850,466, U.S. Pat. No. 4,885,954, U.S. Pat. No. 4,893,704, U.S. Pat. No. 5,338,076, U.S. Pat. No. 5,634,676, U.S. Pat. No. 5,862,903 and U.S. Pat. No. 5,983,739 all of which are hereby incorporated by reference.

Figure 17:
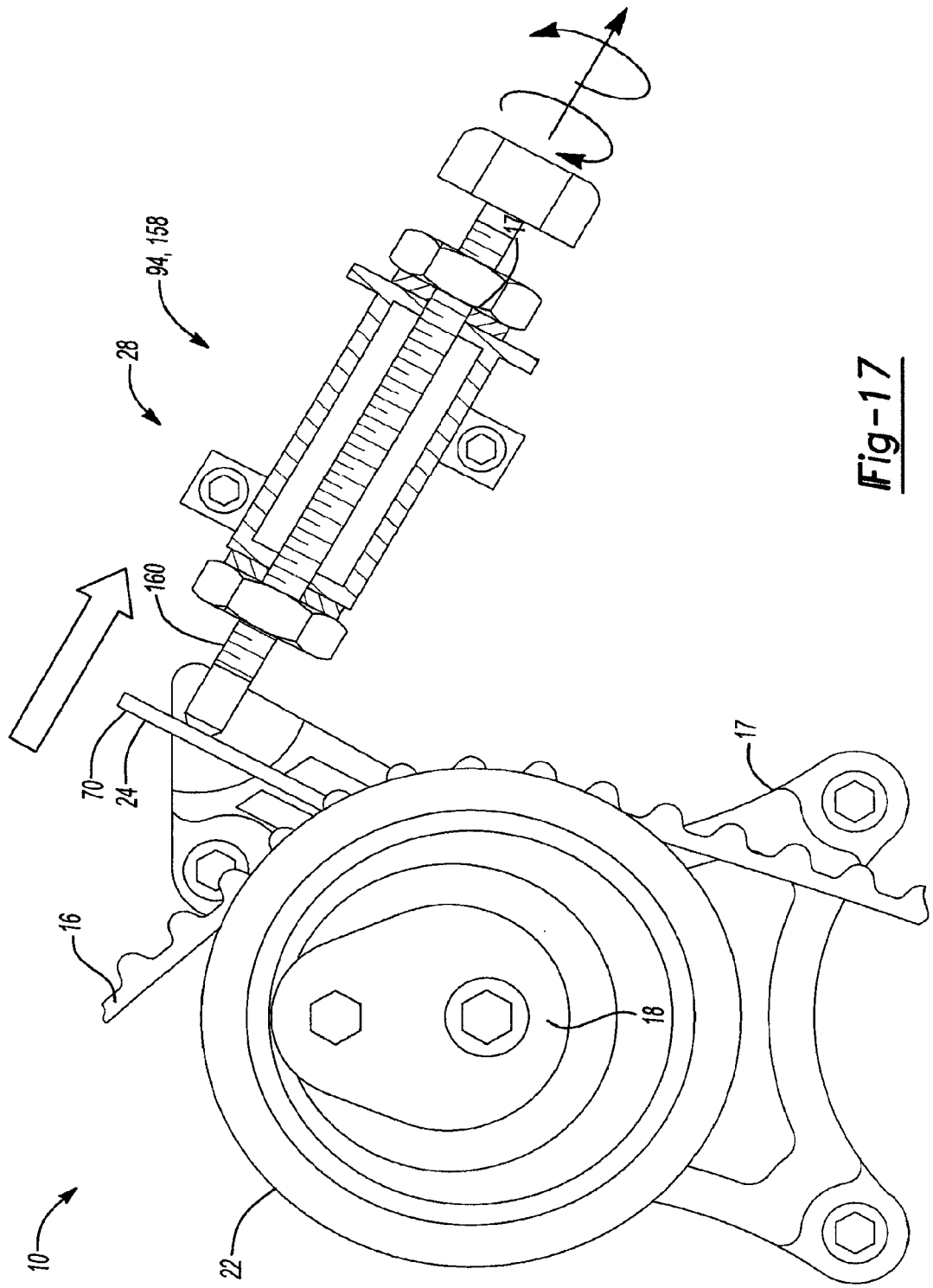
FIG. 17 is a plan view of the tensioner shown in FIG. 1, showing another alternative actuator that includes a screw-jack device.

As an alternative to the gear 144 shown in FIG. 16, the motor output shaft 142 could be used to drive a worm gear which can be provided with a thread arrangement that prevents the worm gear from being backdriven. This would facilitate Reference is made to FIG. 17, wherein the actuator 94 is a screw-jack type actuator 158, which can be adjusted manually as desired to move the second end 70 as needed to adjust the belt tension. The second end 70 is biased in the unwinding direction and so moves in the unwinding direction when the actuation member shown at 160 is retracted.

Figure 18:
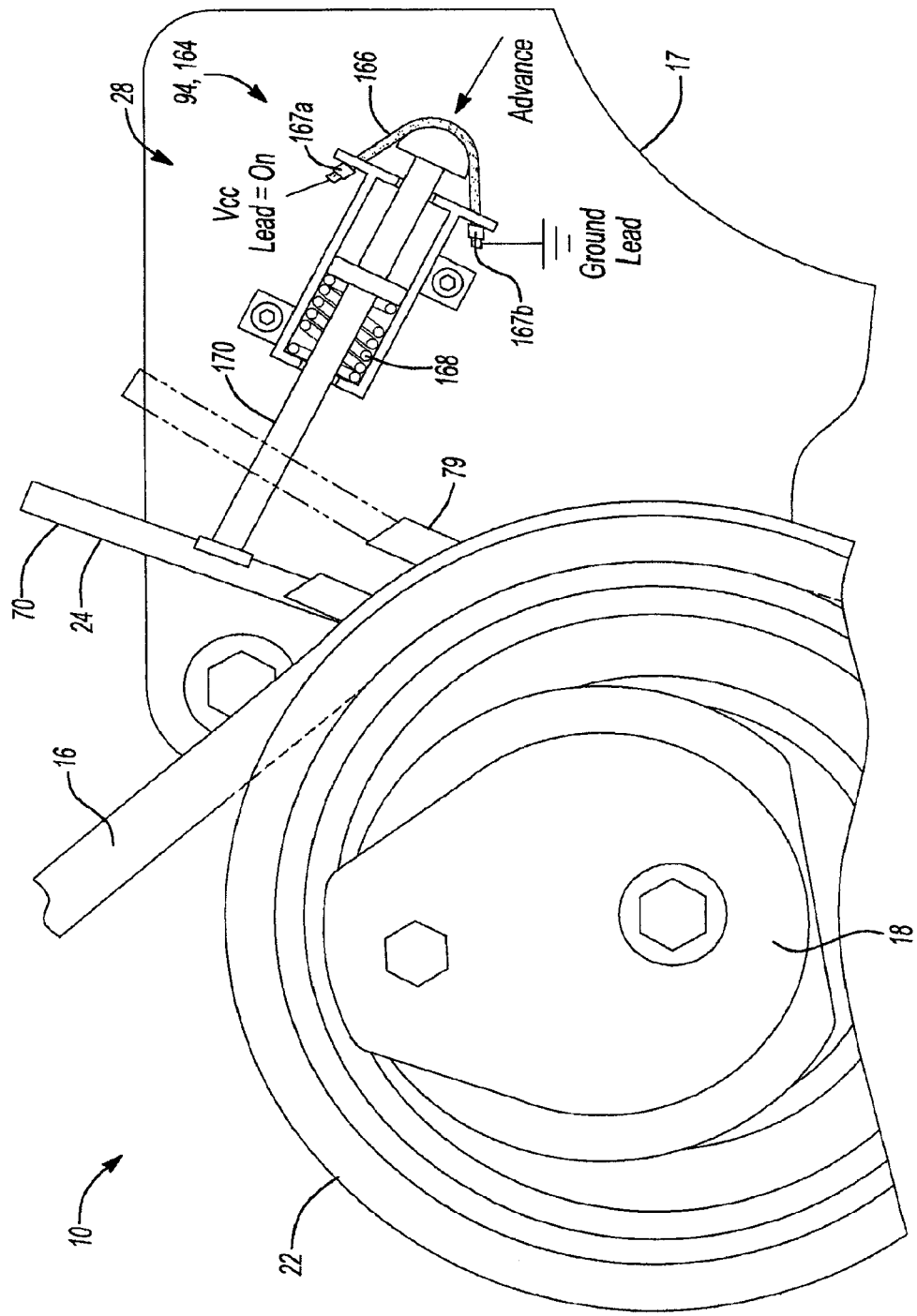
FIGS. 18 and 19 are plan views of the tensioner shown in FIG. 1, showing another alternative actuator that includes an active shape memory alloy actuator in advanced and retracted positions.
Figure 19:
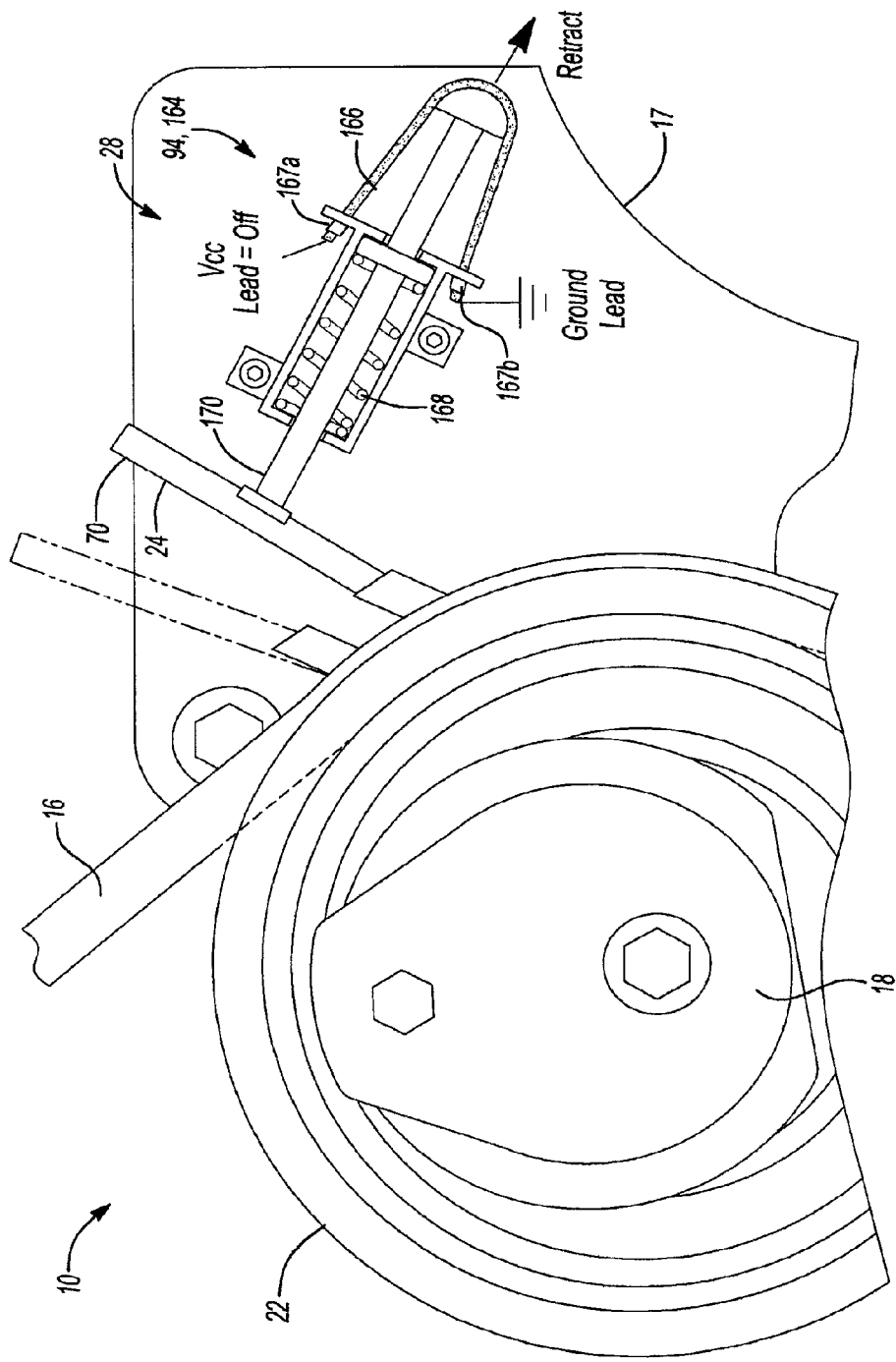

Reference is made to FIGS. 18 and 19, wherein the actuator 94 is an active shape memory alloy actuator 164. The actuator 164 has a shape memory alloy member 166 with a transition temperature that is selected to be outside (preferably above) the operating range of temperatures of the engine 13. For example, the transition temperature may be selected to be approximately 200 degrees Celsius. As a result, the actuator 164 will not be actuated passively by exposure to the engine temperature itself. The actuator may include leads 167a and 167b which are connected as necessary to the vehicle's electrical system (or to any suitable source and ground) and may be heated electrically so as to be selectably actuatable. The actuator 164 shown includes a biasing member 168 that biases the actuation member shown at 170 towards in the unwinding direction, so that when electrical power is on (FIG. 18), the actuator 164 overcomes the biasing member 168 and moves the second end 70 in the winding direction, and when electrical power is cut to the actuator 164 (FIG. 19), the member 166 returns to the low temperature (elongated) shape, and the second end 70 and the biasing member 166 move the actuation member 170 in the unwinding direction. It will be understood that the second end 70 itself may additionally or alternatively act as a biasing member for the actuation member 170. The actuator 164 may be a two position actuator, or may alternatively be configured to be capable of being positioned in 3 or more positions.

An example of a shape memory alloy linear actuator that could be used for the actuator 164 is shown in U.S. Pat. Nos. 4,160,226, 5,345,963 and 5,381,952 all of which are hereby incorporated by reference.

Figure 20:
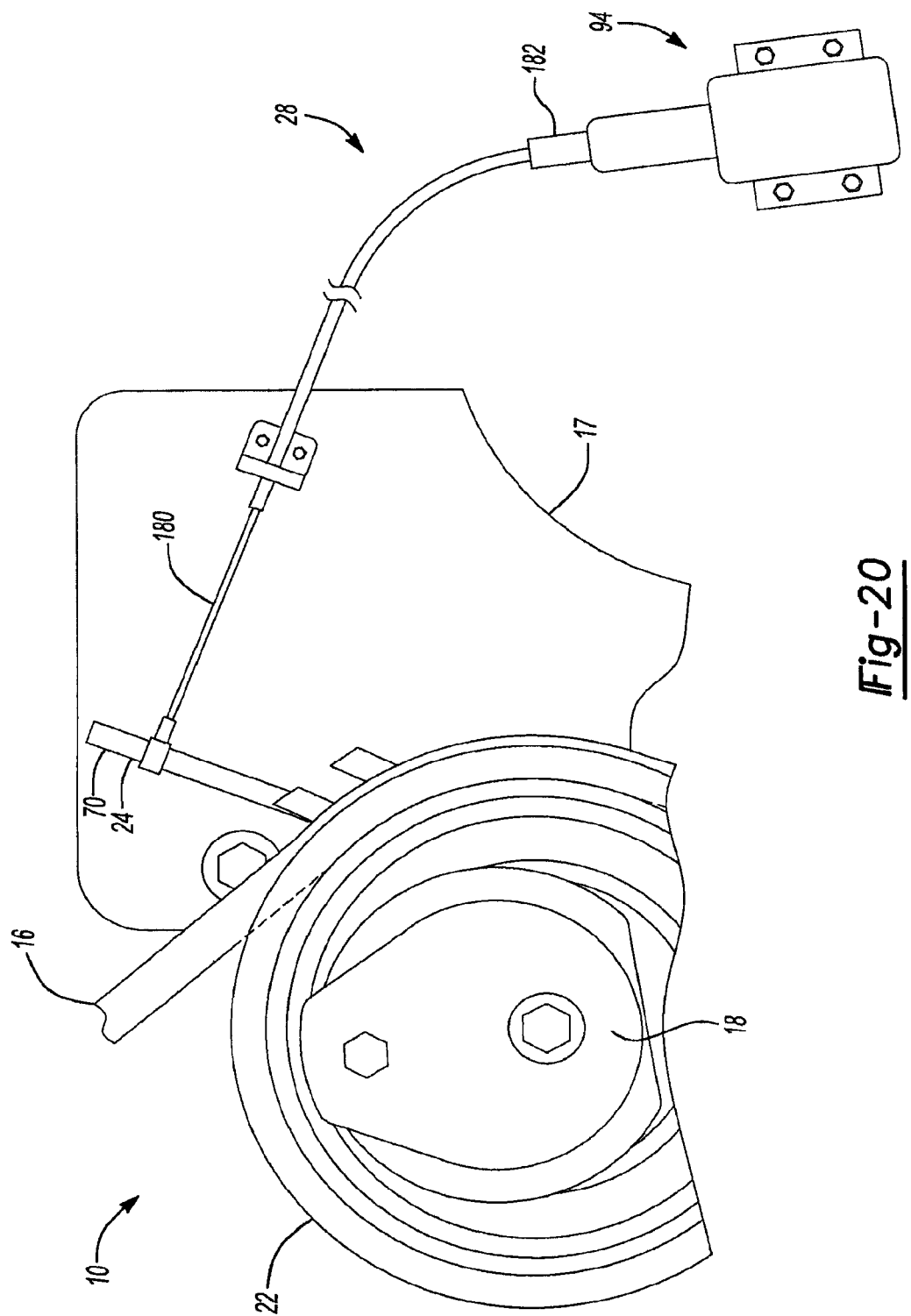
FIG. 20 is a plan view of the tensioner shown in FIG. 1, showing another alternative actuator that includes an actuator that pushes the spring end through a cable.

Reference is made to FIG. 20, wherein the actuator 94 is a linear actuator (e.g. the solenoid 114 or one of the fluid-driven actuator 94 shown in FIGS. 11-12) which acts on the second end 70 via a cable 180. The cable 180 may be any suitable type of cable, such as a Bowden cable. In the embodiment shown in FIG. 20, the cable 180 is moved by the actuation member 182, to push the second end 70 in the winding direction. A biasing member (that may, for example, be part of the actuator (eg. the solenoid 114, or that may be the second end 70 itself) urges the cable in the unwinding direction.

Figure 21:
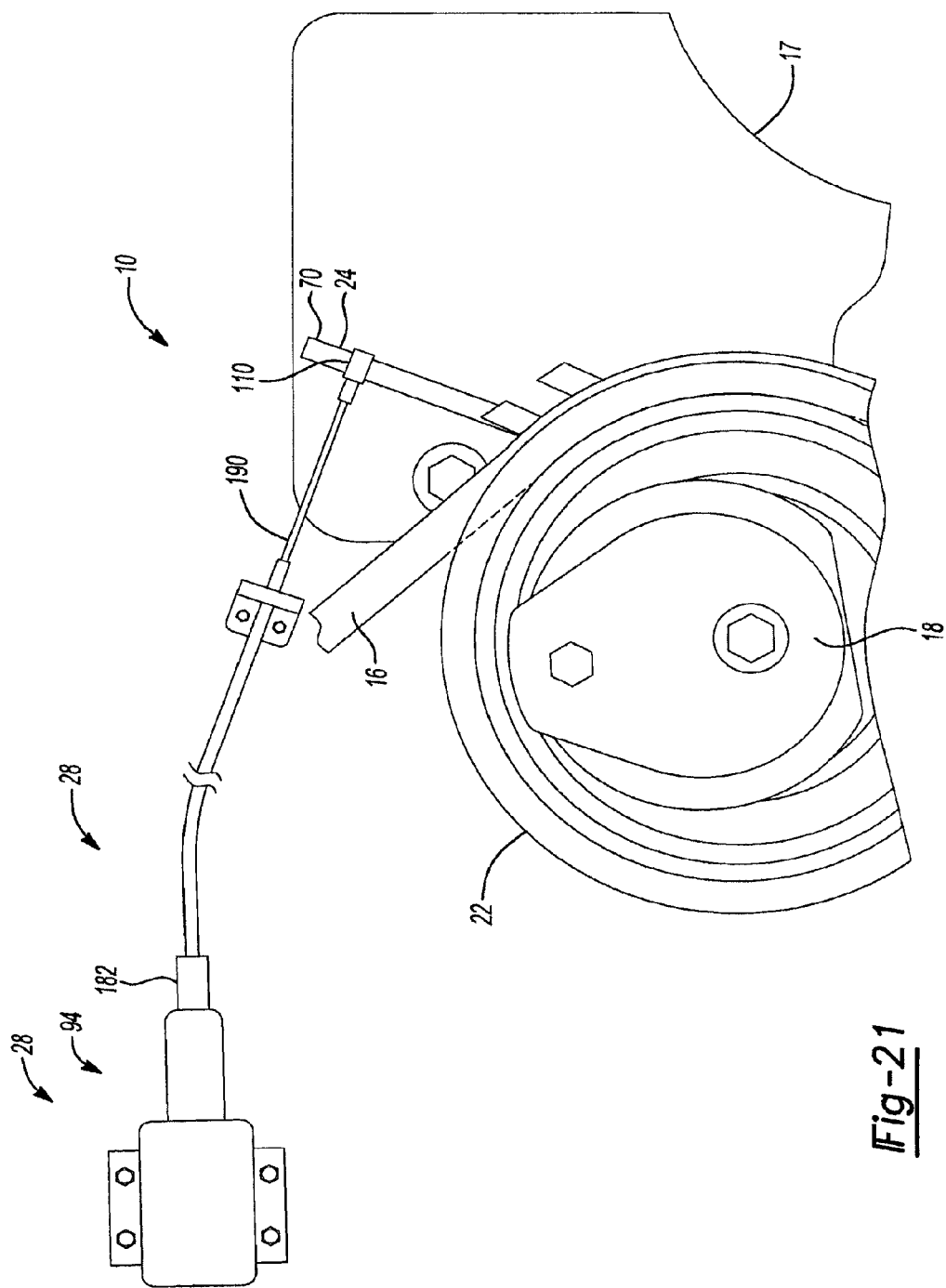
FIG. 21 is a plan view of the tensioner shown in FIG. 1, showing another alternative actuator that includes an actuator that pulls the spring end through a cable.

Reference is made to FIG. 21, wherein the actuator 94 is a linear actuator (e.g. the solenoid 114 or one of the fluid-driven actuator 94 shown in FIGS. 11-12) which acts on the second end 70 via a cable 190, similarly to the embodiment shown in FIG. 20, except that actuation of the cable 190 pulls the second end 70 in the winding direction in the embodiment shown in FIG. 21.

It will be noted that in the embodiments shown in the figures, the second end 70 itself biases the micro-adjustment mechanism 28 in a direction towards unwinding the spring 24 and so may be considered to be part of a biasing structure for the micro-adjustment mechanism 28.

It will be noted that in some of the embodiments shown in FIGS. 11-21, a spherical rod end is used, while in other embodiments a rod is used that has a channel-shaped end. It will be understood that in embodiments that show a rod end with a channel shape a spherical rod end could be used, and in embodiments that show a spherical rod end, a an edge face that is channel shaped could alternatively be used.

It will further be noted that the mechanical linkage shown in FIG. 12 and the cable linkages shown in FIGS. 20 and 21 could be used with several types of actuator, including pneumatic, hydraulic, solenoid and shape memory alloy.

Optionally, the tensioner 10 may include a controller shown at 200 (FIG. 26) that is operatively connected to the micro-adjustment mechanism 28, for adjusting the position of the second end 70 of the spring 24 during use of the vehicle in which the engine 13 and tensioner 10 are installed. The controller 200 may receive inputs from one or more sources and may use those inputs to determine one or more parameters when determining the position at which to set the second end 70 of the spring 24. One parameter in particular that the controller 200 may use is the engine block temperature. The block temperature directly impacts the state of thermal expansion or contraction of the engine 13. The belt 16 however undergoes relatively less dimensional change than the engine block 12, and so when the engine block 12 thermally contracts, the belt 16 slackens and has less tension, and conversely when the engine block 12 thermally expands, the belt 16 tightens and has increased tension.

When the engine block 12 is cool, the belt 16 has relatively low tension, and the tensioner arm 20 pivots towards its free arm stop 76 where the biasing force urging the tensioner arm 20 against the belt 16 is relatively lower. Upon determining that the engine block 12 has a low block temperature, the controller 200 may be programmed to move the second end 70 of the spring 24 in a winding direction to a 'low block temperature' position shown in FIG. 4a, so as to increase the biasing force exerted by the spring 24 on the tensioner arm 20, thereby increasing the tension in the belt 16. This makes the belt 16 less sensitive to certain effects, such as torsional vibrations. A particular example in which the engine 13 has a low block temperature is during startup of the engine 13. In certain engines, such as certain diesel engines, the torsional vibration that is present during startup of the engine is particularly severe, and can generate resonance in the belt 16. By programming the controller 200 to maintain a relatively higher biasing force on the belt 16 when the engine is relatively colder, inhibits the generation of resonance in the belt 16 and its ensuing consequences.

As the engine block 12 warms up after running for some time, the tension in the belt 16 increases as a result of the thermal expansion of the engine block 12. Additionally, in some instances, the amount of torsional vibration in the engine 13 decreases as the engine 13 warms up. The increased tension in the belt 16 moves the tensioner arm 20 in the direction towards the load stop 78 by some amount, which increases the biasing force of the spring 24 on the tensioner arm 20. The biasing force exerted on the tensioner arm 20 and therefore on the belt 16 may at this point be higher than necessary to prevent resonance in the belt 16 however, because there is a reduced level of torsional vibration to cause resonance at this stage. Thus, the controller 200 may be programmed to move the second end 70 of the spring 24 in the unwinding direction to the position shown in FIG. 4b so as to reduce the biasing force of the spring 24, and thereby reduce the belt tension. As a result of the above, the controller 200 maintained a relatively high tension in the belt 16 when it was advantageous to do so to inhibit resonance, and maintained a relatively lower tension in the belt 16 when the factors contributing to the belt resonance were less problematic, thereby reducing parasitic losses on the engine 13.

The input provided to the controller 200 permitting it to determine the block temperature may come from a temperature sensor 202 in the block 12. Instead of receiving temperature information regarding the block 12, the controller 200 may be programmed to always move the second end 70 of the spring 24 in a winding direction to increase the spring biasing force during startup of the vehicle. The controller 200 may be programmed to sense when a selected period of time has passed since the engine startup was initiated. Upon the passage of the selected period of time, the controller 200 may be programmed to adjust the biasing force of the spring 24 downwards, based on the assumption that after the selected period of time has passed, the engine 13 has warmed up by a suitable amount to increase the tension in the belt 16 and no longer has a high degree of torsional vibration.

Another parameter that the controller 200 may use in the determination of a suitable position for the second end 70 of the spring 24 is the tension in the belt 16. To that end, the controller 200 may receive input from a belt tension sensor 204. The belt tension sensor 204 may be any suitable type of sensor. For example, the tension sensor 84 may include a strain gauge on an engagement member that is deflected by the belt 16 by an amount that is related to the tension in the belt 16. Such a sensor is shown in U.S. Pat. No. 6,484,593, which is hereby incorporated by reference. Alternatively, the tension sensor 204 could be a sensor that measures the vibration frequency of the belt 16 during operation of the engine 13, and the controller 200 can determine the belt tension based on the vibration frequency. A particular example of such a sensor is the Clavis Belt Tension Meter manufactured by Integrated Display Systems Limited, Maurice Road, Wallsend, Tyne and Wear, UK, NE28 6BY. Measurement of the belt tension can be used by the controller 200 to adjust the position of the second end 70 of the spring 24. The controller 200 may receive input from the belt tension sensor 204 and may determine based on that alone, or based on other inputs relating to such parameters as the block temperature, where to move the second end 70 of the spring 24 in order to achieve a selected belt tension.

The belt tension sensor 204 may be used as part of a closed-loop control system, used by the controller 200 to achieve a greater degree of precision in the actual belt tension achieved using the tensioner 10. For example, during the startup of the engine 13, the controller 200 may determine, based on input from the temperature sensor 202, that a certain tension is desired in the belt 16 in order to inhibit resonance. Initially the controller 200 may move the second end 70 of the spring 24 to a particular position in an effort to achieve the desired belt tension. During movement of the second end 70 of the spring 24, the controller 200 may receive input from the tension sensor 84 that indicates how close the belt 16 is to the desired tension. Using this input, the controller 200 can home in on the particular position for the second end 70 of the spring 24 that achieves that desired tension.

The controller 200 may determine the particular target tension to achieve in the belt 16 based on inputs from other sensors, such as a temperature sensor for the block 12, the torsional vibration sensor 86, the crankshaft angular position sensor 88.

Another parameter that the controller 200 may determine is the amount of torsional vibration present at any particular moment, using a torsional vibration sensor 206. It will be noted that the term sensor is to be interpreted broadly to include any structure regardless of complexity that is configured to send signals to another device that convey the state of a member in the environment of the sensor. Thus, the sensor may be a complex system of components that work together to sense a property and to convey the property to some device. An exemplary embodiment of a torsional vibration sensor 206 is described in PCT publication WO 2006/045181, which is hereby incorporated by reference. By determining the degree of torsional vibration in the engine, the controller 200 can adjust the tension in the tensioner in such a way as to reduce the likelihood of resonance developing in the belt 16.

Another way of determining torsional vibration may use an engine position sensor 208, which calculates the precise position of the engine (eg. top dead center, etc), such as is shown in U.S. Pat. No. 7,188,021, which is hereby incorporated by reference, and to calculate the expected torsional vibration using the input from sensor 208.

Another exemplary parameter that the controller 200 may determine is the actual amount of belt stretch using a belt stretch sensor 210.

Another parameter that may be determined by the controller 200 is time. For example, the controller 200 may be configured to increase the belt tension to a high level for a selected period of time upon start up of the engine, and may reduce the tension in the belt after the selected period of time on the assumption that the engine has warmed up and torsional vibrations are reduced after that period.

Figure 26:
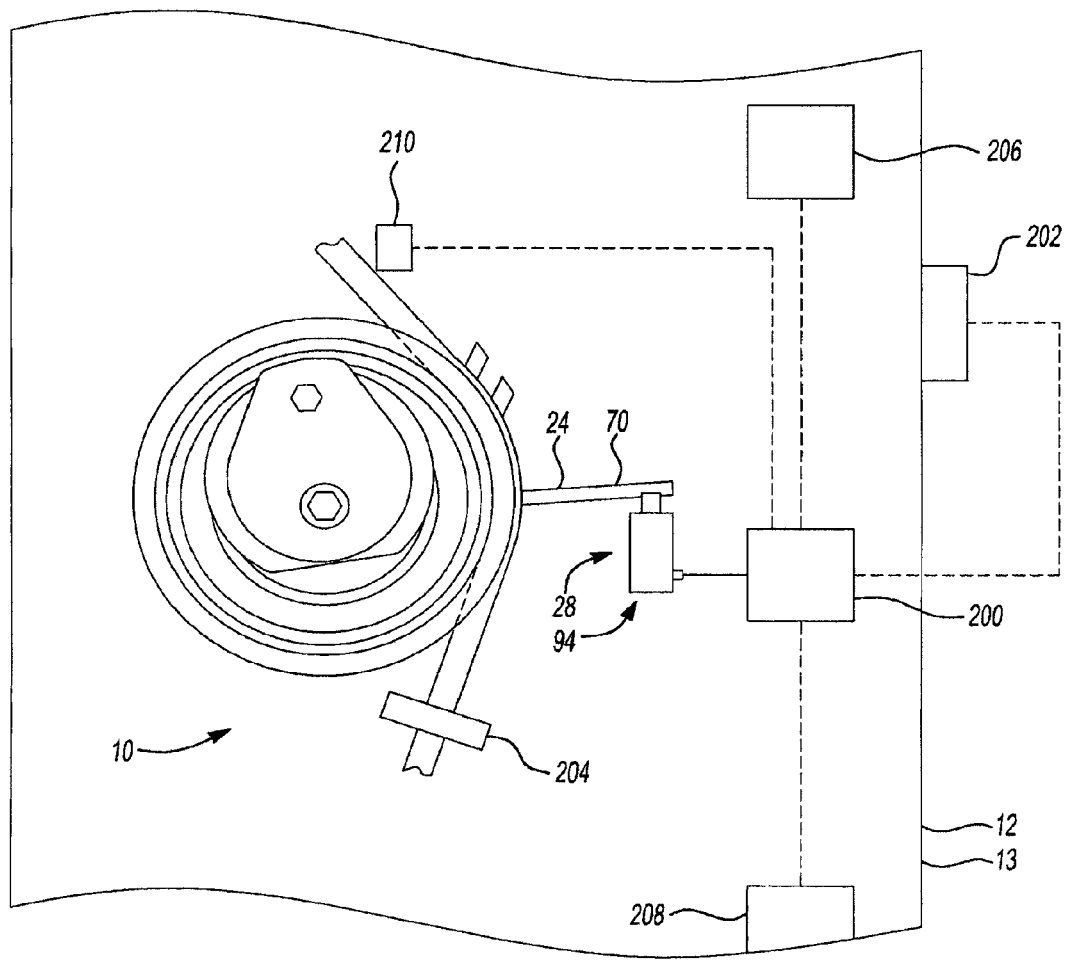
FIG. 26 is a schematic illustration of a controller and sensors that may be included with or used by a tensioner in accordance with an embodiment of the present invention.

It will be understood that the sensors 202, 204, 206, 208 and 210 shown in FIG. 26 are not intended to show their actual positions, but are intended to be convey schematically the sensors connected to the controller 200 and the controller 200 connected to the actuator 94.

It will be noted that the controller 200 could be configured to continuously modify the position of the second end 70 so that the effective tension profile is relatively flat (i.e. constant) over some range of angles for the tensioner arm 20. Alternatively the controller 200 could be configured to provide any effective shape to the tension profile of the tensioner, by continuously adjusting the position of the second end 70.

Alternatively, the controller 200 could operate using open looped control wherein the controller 70 moves the second end 70 of the spring 24 in response to an input (eg. belt tension, or block temperature), but wherein the controller 200 is not provided with feedback to determine whether it has actually provided the belt 16 with the desired tension.

It has been described for the fine adjustment system 28 to be provided in conjunction with a broad adjustment system 26 that entails a pivot shaft having an eccentric shape and which is rotated to control the position of the tensioner arm pivot axis. It is alternatively possible for the tensioner to have a broad adjustment system that is linear instead of rotary. An example of such a linear adjustment mechanism is shown in U.S. Pat. No. 6,149,542, the entirety of which is incorporated herein by reference.

The base plate 17 is advantageous in that it permits the tensioner 10 to be preinstalled in an operating position so that the base plate 17 can be simply mounted to the engine 13 using the fasteners 32 (FIG. 1). Once the base plate 17 is mounted to the engine 13, the micro-adjustment mechanism 28 may be adjusted manually or automatically as desired to set the tension profile for that particular tensioner 10. This reduces the overall installation time and skill needed for installing the tensioner. It will be understood, however, that the base plate 17 may be omitted, and the pivot shaft 18 may be mounted directly to an aperture in the engine block 12 via the fastener 14. The micro-adjustment mechanism 28 would also be individually installed in one or more suitable apertures on the engine block 12 in such an embodiment. While this would eliminate the cost associated with providing the base plate 17 it would increase the installation time for the tensioner 10 since the pivot shaft 18 would require its rotational angle to be adjusted during installation and since two components (ie. the pivot shaft 18 and the micro-adjustment mechanism 28) would be installed on the block 12 instead of one component (the base plate 17).

The tensioner 10 shown herein includes an eccentrically mounted pivot arm 18. It will be noted that micro-adjustment mechanism 28 could be provided for adjusting the belt tension on other types of tensioner, such as tensioners with concentric pivot shafts, such as are shown in US publication 2009/0011881, which is hereby incorporated by reference. Such a tensioner includes a one-way clutch.

It will be noted that the tensioner 10 can be installed on an engine and, after being installed, can be fine tuned using the micro-adjustment mechanism. As a result, the tensioner 10 can be adjusted to some extent while the fastener 14 is fully tightened. This permits the tensioner 14 to be fine-tuned while the engine is on, burning fuel. This permits the tensioner 10 to be most accurately adjusted, since having the engine running and burning fuel most closely matches the conditions in which the tensioner will be operating when in a vehicle. It will be understood that the engine could alternatively be turned by other methods, such as by rotation of the crankshaft after removal of the spark plugs, or by rotation of the engine with the spark plugs mounted, either by electric motor or manually.

It will also be noted that the tensioner 10 may be preinstalled on the base plate 17 prior to installation of the base plate 17 on the engine. The base plate may then be installed on the engine by a suitable robotic device and the fine tuning using the micro-adjustment mechanism 28 may also be carried out using suitable robotic/automated devices. As a result, the entire process of mounting the tensioner 10 may be automated.

While the above description constitutes a plurality of embodiments of the present invention, it will be appreciated that the present invention is susceptible to further modification and change without departing from the fair meaning of the accompanying claims.

The invention claimed is:

1. A belt tensioner for tensioning a belt, comprising:
   a pivot shaft that is adapted to be fixedly mountable with respect to an engine block of an engine;
   a tensioner arm rotatably mounted to the pivot shaft for pivoting about a tensioner arm axis between a free arm stop position and a load stop position;
   a pulley rotatably mounted to the tensioner arm for rotation about a pulley axis; and
   a tensioner spring biasing the tensioner arm towards the free arm stop position, wherein the tensioner spring has a first end and a second end, wherein the first end is engaged with the tensioner arm; and a micro adjustment mechanism that is operable for directly controlling the position of the second end of the tensioner spring relative to the first end of the tensioner spring to thereby control the tension in the tensioner spring, the micro adjustment mechanism having an output member that is directly mounted to the second end of the tensioner spring such that movement of the output member causes corresponding movement of the second end of the tensioner spring relative to the pivot shaft.

2. The belt tensioner of claim 1, further comprising a free arm stop and a load stop, wherein the free arm stop and the load stop control the free arm stop position and the load stop position respectively of the tensioner arm, wherein the micro adjustment mechanism controls the amount of angular range available between the tensioner arm and the free arm stop position and between the tensioner arm and the load stop position.

3. The belt tensioner of claim 1, wherein the micro adjustment mechanism includes a linear actuator that includes an actuation member that engages the second end of the tensioner spring.

4. The belt tensioner of claim 3, wherein the actuation member is a piston that is positioned in a fluid chamber that has a first end and a first fluid port at the first end for receiving fluid at a first selectable pressure for urging the piston in a first direction and wherein the micro adjustment mechanism further includes a piston biasing member positioned for biasing the actuation member in a second direction that is opposed to the first direction.

5. The belt tensioner of claim 3, wherein the actuation member is a piston that is positioned in a fluid chamber that has a first end and a first fluid port at the first end for receiving fluid at a first selectable pressure, and wherein the fluid chamber has a second end and has a second fluid port at the second end for receiving fluid at a second selectable pressure, wherein the piston is movable as a result of the pressures of the fluid at the first and second ends between a first position and a second position, the first and second positions corresponding to first and second positions of the second end of the tensioner spring.

6. The belt tensioner of claim 5, wherein the fluid chamber further includes a biasing structure for biasing the piston towards a third position that is between the first and second positions, and which corresponds to a third position of the second end of the tensioner spring.

7. The belt tensioner of claim 3, wherein the linear actuator is a solenoid that is connectable to an electrical source.

8. The belt tensioner of claim 3, wherein the rotary actuator is a solenoid that is connectable to an electrical source.

9. The belt tensioner of claim 1, further comprising a controller, wherein the controller is operatively connected to the micro adjustment mechanism and is configured to adjust the position of the second end of the spring based on at least one parameter.

10. The belt tensioner of claim 1, wherein the at least one parameter includes the temperature of the engine block.

11. The belt tensioner of claim 1, wherein the at least one parameter includes the tension in the belt.

12. The belt tensioner of claim 1, further comprising a base plate that is connected to the pivot shaft, wherein the base plate is engageable with a base plate locking structure on the engine block to fix the rotational position of the base plate relative to the engine block.

13. The belt tensioner of claim 1, further comprising a fail-safe spring limit structure that is connectable to the engine block at a selected position to prevent the movement of the second end of the tensioner spring therepast in the event of a failure of the micro adjustment mechanism.

14. The belt tensioner of claim 1, further comprising a macro-adjustment mechanism operatively connected to control the position of the tensioner arm axis.

15. The belt tensioner of claim 14, wherein the pivot shaft has a fastener aperture that extends along a pivot shaft rotation axis, and that is configured for the pass-through of a pivot shaft fastener, and wherein the pivot shaft has a tensioner arm mounting surface about which the tensioner arm is rotatably mounted for rotation along a tensioner arm pivot axis, wherein the tensioner arm pivot axis and the pivot shaft rotation axis are spaced from each other, and wherein the position of the fastener aperture and the position of the tensioner arm mounting surface are included in the macro-adjustment mechanism.

16. The belt tensioner of claim 1, wherein the micro adjustment mechanism includes an actuation member and a motor, wherein the motor is stoppable in at least three positions of the actuation member.

17. The belt tensioner of claim 16 wherein the motor is operatively connected to a worm, and the worm has a selected flight profile to prevent backdriving of the motor, and wherein the worm is operatively connected to the actuation member.

18. A method of tensioning a belt on an engine, comprising:
a) providing a tensioner that includes a pivot shaft, a tensioner arm rotatably mounted to the pivot shaft for pivoting about a tensioner arm axis between a free arm stop position and a load stop position, a pulley rotatably mounted to the tensioner arm for rotation about a pulley axis, a tensioner spring positioned to bias the tensioner arm towards the free arm stop position, wherein the tensioner spring has a first end and a second end, wherein the first end is engaged with the tensioner arm;
b) mounting the tensioner to an engine block of the engine in such a way that the tensioner arm axis is fixed and such that the pulley is engaged with the belt; and
c) moving the second end of the tensioner spring relative to the first end of the tensioner spring while keeping the tensioner arm axis fixed, to adjust the biasing force with which the tensioner arm engages the belt;
wherein step c) includes determining the temperature of the engine block, and moving the second end of the tensioner spring based on the temperature of the engine block; and wherein the tensioner further includes a micro adjustment mechanism that is operatively connected to control the position of the second end of the tensioner spring, wherein the micro adjustment mechanism includes an actuator that includes an actuation member that engages the second end of the tensioner spring.

19. A method as claimed in claim 18, further comprising a controller that is operatively connected to the micro adjustment mechanism through which the controller is configured to adjust the position of the second end of the spring.

20. A method as claimed in claim 19, further comprising adding fuel to the engine, starting the engine and operating the engine by combusting the fuel, and carrying out step c) during operation of the engine.

* * * * *